(12) United States Patent
Lim et al.

(10) Patent No.: US 10,484,040 B2
(45) Date of Patent: Nov. 19, 2019

(54) APPARATUS AND METHOD FOR CANCELLING SELF-INTERFERENCE SIGNAL IN COMMUNICATION SYSTEM SUPPORTING FULL-DUPLEX SCHEME

(71) Applicant: Samsung Electronics Co., Ltd., Suwon-si, Gyeonggi-do (KR)

(72) Inventors: Jong-Bu Lim, Yongin-si (KR);
Byung-Hwan Lee, Yongin-si (KR);
Ji-Yun Seol, Seongnam-si (KR);
Tae-Young Kim, Seongnam-si (KR);
Min Sagong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 251 days.

(21) Appl. No.: 15/149,607

(22) Filed: May 9, 2016

(65) Prior Publication Data
US 2016/0329982 A1 Nov. 10, 2016

(30) Foreign Application Priority Data

May 7, 2015 (KR) ........................ 10-2015-0063708

(51) Int. Cl.
*H04L 5/14* (2006.01)
*H04N 19/117* (2014.01)
(Continued)

(52) U.S. Cl.
CPC . *H04B 1/58* (2013.01); *H04L 5/14* (2013.01)

(58) Field of Classification Search
CPC .......... H04L 5/14; H04B 1/58; H04J 11/0023; H04N 19/117
See application file for complete search history.

(56) References Cited

U.S. PATENT DOCUMENTS

| | | | |
|---|---|---|---|
| 5,596,439 A | 1/1997 | Dankberg et al. | |
| 2003/0036359 A1* | 2/2003 | Dent ...................... | H04B 7/005 455/63.1 |

(Continued)

FOREIGN PATENT DOCUMENTS

| | | |
|---|---|---|
| CN | 104518808 A | 4/2015 |
| EP | 1 841 084 A2 | 10/2007 |
| WO | 2015/048678 A1 | 4/2015 |

OTHER PUBLICATIONS

Alok Sethi, et al. Self-interference Channel for Full Duplex Transceivers, pp. 781-785, 2014.
(Continued)

*Primary Examiner* — Edan Orgad
*Assistant Examiner* — Nourali Mansoury
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for cancelling a self-interference (SI) signal in a communication system supporting a full-duplex scheme is provided. The method includes estimating an SI channel, performing a pre-filtering operation on a transmission signal based on the estimated SI channel, generating copied-SI signals based on the estimated SI channel, and cancelling an SI signal based on the copied-SI signals, wherein the pre-filtering operation includes an operation for decreasing a number of SI signals.

18 Claims, 14 Drawing Sheets

(51) Int. Cl.
*H04J 11/00* (2006.01)
*H04B 1/58* (2006.01)

(56) References Cited

U.S. PATENT DOCUMENTS

| | | |
|---|---|---|
| 2004/0058653 A1* | 3/2004 | Dent .................. H04L 7/02 |
| | | 455/69 |
| 2004/0131134 A1* | 7/2004 | Hiroyasu ............ H01Q 3/2611 |
| | | 375/347 |
| 2004/0151235 A1 | 8/2004 | Olson et al. |
| 2008/0107046 A1 | 5/2008 | Kangasmaa et al. |
| 2010/0034241 A1* | 2/2010 | Krishnamurthy ........................ |
| | | H04L 25/03292 |
| | | 375/219 |
| 2011/0143655 A1* | 6/2011 | Ahn ................ H04B 7/15542 |
| | | 455/9 |
| 2013/0301487 A1 | 11/2013 | Khandani |
| 2014/0016515 A1 | 1/2014 | Jana et al. |
| 2014/0050124 A1 | 2/2014 | Yang et al. |
| 2014/0198688 A1 | 7/2014 | Li et al. |
| 2014/0348018 A1 | 11/2014 | Bharadia et al. |
| 2015/0326269 A1* | 11/2015 | Ko .................... H04B 1/525 |
| | | 375/219 |
| 2015/0382375 A1* | 12/2015 | Bhushan ............ H04L 5/0005 |
| | | 370/252 |
| 2016/0211927 A1 | 7/2016 | Mo et al. |
| 2016/0226653 A1* | 8/2016 | Bharadia ............ H04B 1/525 |
| 2016/0269094 A1* | 9/2016 | Kim .................. H04B 7/155 |

OTHER PUBLICATIONS

Chinese Office Action dated Aug. 31, 2018, issued in Chinese Application No. 201680026579.6.

* cited by examiner

BEFORE PRE-FILTERING OPERATION SCHEME IS APPLIED

AFTER PRE-FILTERING OPERATION SCHEME IS APPLIED

APPARATUS AND METHOD FOR CANCELLING SELF-INTERFERENCE SIGNAL IN COMMUNICATION SYSTEM SUPPORTING FULL-DUPLEX SCHEME

CROSS-REFERENCE TO RELATED APPLICATION(S)

This application claims the benefit under 35 U.S.C. § 119(a) of a Korean patent application filed on May 7, 2015 in the Korean Intellectual Property Office and assigned Serial number 10-2015-0063708, the entire disclosure of which is hereby incorporated by reference.

TECHNICAL FIELD

The present disclosure relates to an apparatus and method for canceling a self-interference (SI) signal in a communication system. More particularly, the present disclosure relates to an apparatus and method for canceling an SI signal in a communication system supporting a full-duplex scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and Feher's quadrature amplitude modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A communication system supporting a full-duplex scheme may increase system capacity doubles by performing a transmitting operation and a receiving operation on the same frequency at the same time.

In the communication system supporting the full-duplex scheme, there is a self-interference (SI) signal which occurs since a signal transmitted by a transmitting device is received in the transmitting device due to a characteristic of the full-duplex scheme.

So, various schemes for canceling the SI signal have been proposed in the communication system supporting the full-duplex scheme, and a typical one is a scheme for cancelling an SI signal which affects a receiving circuit of a transmitting device in a circuit domain.

The scheme for cancelling the SI signal in the circuit domain may be classified into a digital SI cancellation (SIC) scheme and an analog SIC scheme according to whether magnitude of the SI signal is within a digital dynamic range that the SI signal may be received in a digital domain. The digital SIC scheme denotes a scheme for cancelling an SI signal using a digital signal processing scheme, and the analog SIC scheme denotes a scheme for cancelling an SI signal using both an analog circuit and a digital signal processing scheme. It is general to use the digital SIC scheme and the analog SIC scheme at the same time for cancelling an SI signal in a system level.

Each of the digital SIC scheme and the analog SIC scheme will be described below.

Firstly, the analog SIC scheme will be described below.

In the analog SIC scheme, it will be assumed that a received SI signal includes a finite number of signals received after fixed delay time which a transmitting device already knows after the transmitting device transmits a signal. Under this assumption, the analog SIC scheme may adjust a gain for a transmission signal which is divided from an analog transmitting circuit included in the transmitting device, and cancel an SI signal from a signal received from the transmitting device by applying a circuit with fixed delay time. Here, the gain adjusted through the circuit may be acquired based on an interference characteristic estimated by the transmitting device.

Secondly, the digital SIC scheme will be described below.

The digital SIC scheme detects a channel characteristic from difference between a transmission signal and a reception signal using a signal divided from a digital transmission signal of a transmitting device and a digital reception signal which is received using a digital signal processing scheme in the transmitting device, and cancels an SI signal from the digital reception signal by applying the channel characteristic in reverse.

The digital SIC scheme may cancel only an SI signal which is within a digital dynamic range. So, an SI signal which is not within the digital dynamic range may be cancelled only after an analog SIC operation is performed.

So, a performance of a communication system supporting a full-duplex scheme which uses the digital SIC scheme is determined according to a performance of the analog SIC scheme.

The analog SIC scheme is implemented with a scheme for previously predicting the number of SI signals which are received in a transmitting device after being reflected from the transmitting device, and adding an analog circuit which may cancel each SI signal.

The analog SIC scheme may not cancel an SI signal if a characteristic of the SI signal is different from a characteristic of an SI signal predicted by the analog circuit, or the number of SI signals is greater than the number of SI signals predicted by the analog circuit due to various reasons such as a situation that an SI signal is received from an outside of a transmitting device, and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for cancelling a self-interference (SI) signal in a communication system.

Another aspect of the present disclosure is to provide an apparatus and method for cancelling an SI signal in a communication system supporting a full-duplex scheme.

Another aspect of the present disclosure is to provide an apparatus and method for cancelling an SI signal thereby decreasing the number of SI signals in a communication system supporting a full-duplex scheme.

Another aspect of the present disclosure is to provide an apparatus and method for cancelling an SI signal based on a pre-filtering scheme in a communication system supporting a full-duplex scheme.

Another aspect of the present disclosure is to provide an apparatus and method for cancelling an SI signal in a case that a multiple input multiple output (MIMO) scheme is used in a communication system supporting a full-duplex scheme.

Another aspect of the present disclosure is to provide an apparatus and method for cancelling an SI signal thereby decreasing the number of SI signals in a case that a MIMO scheme is used in a communication system supporting a full-duplex scheme.

Another aspect of the present disclosure is to provide an apparatus and method for cancelling an SI signal based on a pre-filtering scheme in a case that a MIMO scheme is used in a communication system supporting a full-duplex scheme.

In accordance with an aspect of the present disclosure, a method for cancelling an SI signal in a communication system supporting a full-duplex scheme is provided. The method includes estimating an SI channel, performing a pre-filtering operation on a transmission signal based on the estimated SI channel, generating copied-SI signals based on the estimated SI channel, and cancelling an SI signal based on the copied-SI signals, wherein the pre-filtering operation includes an operation for decreasing a number of SI signals.

In accordance with another aspect of the present disclosure, an apparatus for cancelling an SI signal in a communication system supporting a full-duplex scheme is provided. The apparatus includes a multi-path SI estimator configured to estimate an SI channel, a pre-filtering unit configured to perform a pre-filtering operation on a transmission signal based on the estimated SI channel, analog SI cancellation (SIC) circuits configured to generate copied-SI signals based on the estimated SI channel, and a digital SIC unit configured to cancel an SI signal based on the copied-SI signals, wherein the pre-filtering operation includes an operation for decreasing a number of SI signals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
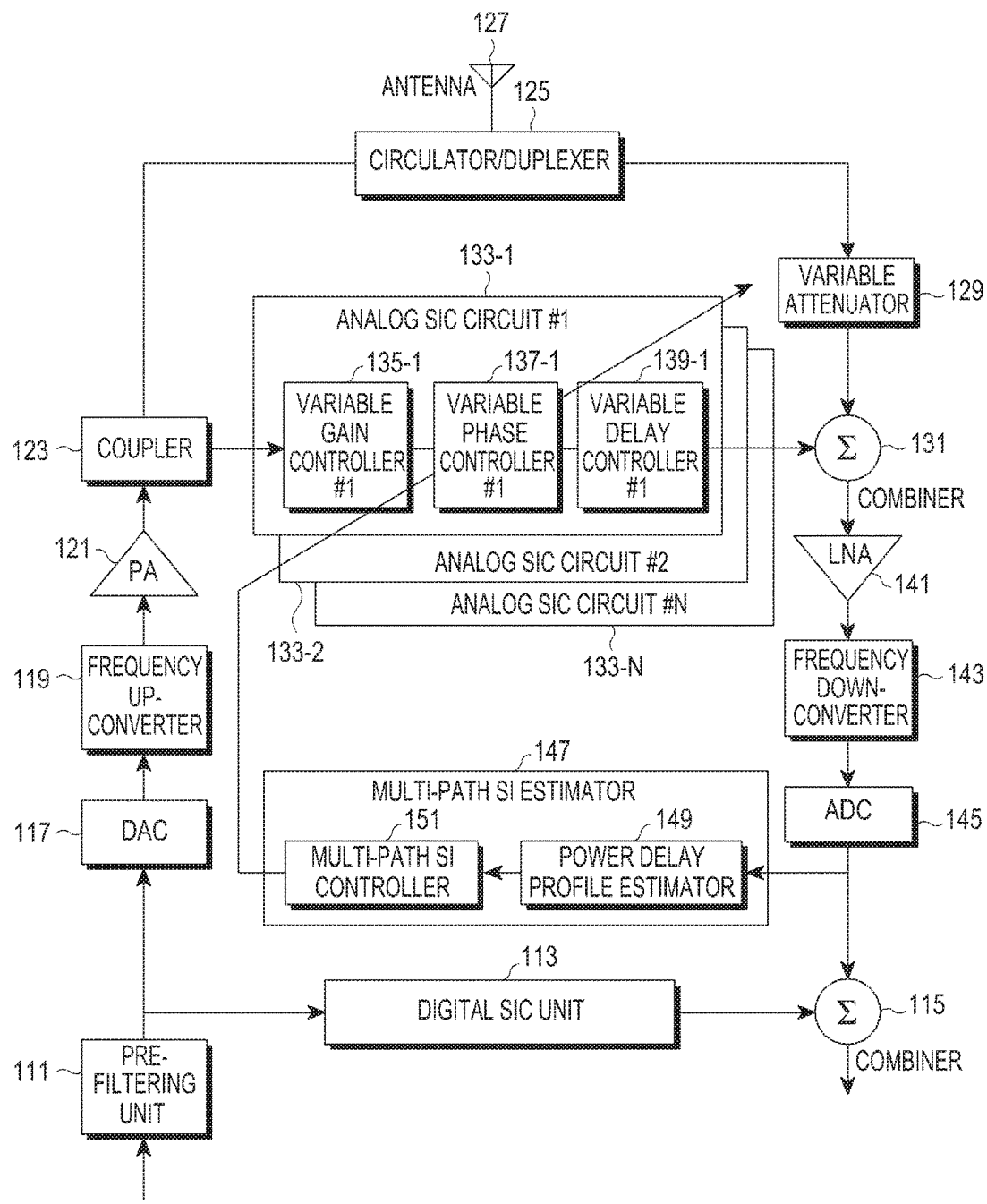
FIG. 1 schematically illustrates an example of an inner structure of a self-interference cancellation (SIC) apparatus in a full-duplex communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and 'associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a transmitting device may be an electronic device.

According to various embodiments of the present disclosure, the transmitting device may be a user equipment (UE) or an evolved node B (eNB). The term UE may be interchangeable with the term mobile station (MS), wireless terminal, mobile device, and the like. The term eNB may be interchangeable with the term node B, base station (BS), evolved universal terrestrial radio access network (E-UTRAN) eNB, access point (AP), and the like.

An embodiment of the present disclosure proposes an apparatus and method for cancelling a self-interference (SI) signal in a communication system.

An embodiment of the present disclosure proposes an apparatus and method for cancelling an SI signal in a communication system supporting a full-duplex scheme.

An embodiment of the present disclosure proposes an apparatus and method for cancelling an SI signal thereby decreasing the number of SI signals in a communication system supporting a full-duplex scheme.

An embodiment of the present disclosure proposes an apparatus and method for cancelling an SI signal based on a pre-filtering scheme in a communication system supporting a full-duplex scheme.

An embodiment of the present disclosure proposes an apparatus and method for cancelling an SI signal in a case that a multiple input multiple output (MIMO) scheme is used in a communication system supporting a full-duplex scheme.

An embodiment of the present disclosure proposes an apparatus and method for cancelling an SI signal thereby decreasing the number of SI signals in a case that a MIMO scheme is used in a communication system supporting a full-duplex scheme.

An embodiment of the present disclosure proposes an apparatus and method for cancelling an SI signal based on a pre-filtering scheme in a case that a MIMO scheme is used in a communication system supporting a full-duplex scheme.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (mobile IP) system, a digital video broadcast system such as a mobile broadcast service such as a digital multimedia broadcasting (DMB) service, a DVB-handheld (DVB-H), an advanced TV systems committee-mobile/handheld (ATSC-M/H) service, and the like, and an IPTV, an MPEG media transport (MMT) system and/or the like.

For convenience, a communication system supporting a full-duplex scheme will be referred to as "full-duplex communication system".

An embodiment of the present disclosure proposes an analog SI cancellation (SIC) circuit for cancelling an SI signal due to reflection which occurs inside or outside of a transmitting device, an estimating operation for an SI signal for controlling the analog SIC circuit, a control operation for the analog SIC circuit which is based on the estimating operation, and a pre-filtering scheme for decreasing the number of SI signals in a communication system supporting a full-duplex scheme.

An embodiment of the present disclosure proposes an operating process of a transmitter and a receiver included in the transmitting device in a case that a scheme for cancelling an SI signal is applied in a communication system supporting a full-duplex scheme. For convenience, a scheme for cancelling an SI signal will be referred to as "SIC scheme".

An embodiment of the present disclosure proposes a scheme for applying an SIC scheme in a case that a MIMO scheme is used in a communication system supporting a full-duplex scheme.

Firstly, a communication system supporting a full-duplex scheme considers all situations that may occur in the communication system supporting the full-duplex scheme in order to cancel all of a plurality of SI signals of which delay time, amplitude, and phases are random. Therefore, so many analog SIC circuits are required. It may be impossible to perfectly cancel all SI signals which may occur in the communication system supporting the full-duplex scheme due to implementation complexity, and the like.

An embodiment of the present disclosure uses channel information for each of a wired channel and a wireless channel on which an SI signal occurs in order to cancel a plurality of SI signals which may occur in a communication system supporting a full-duplex scheme. The wired channel denotes a channel which is generated since a transmission signal is reflected inside a transmitting device, and the wireless channel denotes a channel which the transmission signal experiences until the transmission signal is received in a reception antenna (Rx antenna) included in the transmitting device after the transmission signal is transmitted to outside of the transmitting device through a transmission antenna (Tx antenna) and the transmission signal is reflected outside of the transmitting device. The Tx antenna and the Rx antenna may be implemented as one antenna or may be separate antennas. The Tx antenna and the Rx antenna may be implemented with various forms, and a detailed description thereof will be omitted herein.

A plurality of SI signals of which delay time, amplitude, and phases are random may be cancelled by configuring a plurality of circuits for cancelling an SI signal. For convenience, a circuit for cancelling an SI signal will be referred to as "SIC circuit". The SIC circuit may be applied to all of a structure that a Tx antenna is identical to an Rx antenna and a structure that a Tx antenna and an Rx antenna are implemented as separate antennas. Whether to implement a Tx antenna and an Rx antenna as separate antennas may be determined based on convenience of hardware configuration and whether to control an SI signal in antenna level, and this will be described below, so a detailed description thereof will be omitted herein.

An example of an inner structure of an SIC apparatus in a full-duplex communication system according to an embodiment of the present disclosure will be described with reference to FIG. 1. Here, an SIC apparatus denotes an apparatus for cancelling an SI signal.

FIG. 1 schematically illustrates an example of an inner structure of an SIC apparatus in a full-duplex communication system according to an embodiment of the present disclosure.

Referring to FIG. 1, it will be noted that an SIC apparatus in FIG. 1 is an SIC apparatus in a case that a Tx antenna and an Rx antenna are implemented as one antenna, and a combiner for combining copied-SI signals and a reception signal is located before a low noise amplifier (LNA) included in a receiver. Here, a copied-SI signal denotes a signal which is generated by copying an SI signal, not an actual SI signal.

The SIC apparatus includes a pre-filtering unit 111, a digital SIC unit 113, a combiner 115, a digital to analog converter (DAC) 117, a frequency up-converter 119, a power amplifier (PA) 121, a coupler 123, a circulator/duplexer 125, an antenna 127, a variable attenuator 129, a combiner 131, a plurality of analog SIC circuits, e.g., N analog SIC circuits, i.e., an analog SIC circuit #1 133-1, an analog SIC circuit #2 133-2, . . . , an analog SIC circuit #N 133-N, an LNA 141, a frequency down-converter 143, an analog to digital converter (ADC) 145, and a multi-path SI estimator 147.

Each of the analog SIC circuit #1 133-1, the analog SIC circuit #2 133-2, ..., the analog SIC circuit #N 133-N includes a variable gain controller, a variable phase controller, and a variable delay controller. That is, the analog SIC circuit #1 133-1 includes a variable gain controller #1 135-1, a variable phase controller #1 137-1, and a variable delay controller #1 139-1. In this way, the analog SIC circuit #N 133-N as the last analog SIC circuit includes a variable gain controller #N 135-N, a variable phase controller #N 137-N, and a variable delay controller #N 139-N.

The multi-path SI estimator 147 includes a power delay profile estimator 149 and a multi-path SI controller 151.

When a signal is received through the antenna 127, the received signal is input to the circulator/duplexer 125. The circulator/duplexer 125 outputs the signal received through the antenna 127 to the variable attenuator 129, and the variable attenuator 129 attenuates the signal output from the circulator/duplexer 125 by applying a preset attenuation value to the signal output from the circulator/duplexer 125 to output the attenuated signal to the combiner 131.

The combiner 131 cancels N SI signals of which strength is maximum among a plurality of SI signals which are received by the SIC apparatus by combining the signal output from the variable attenuator 129 and the copied-SI signals output from the analog SIC circuit #1 133-1, the analog SIC circuit #2 133-2, ..., the analog SIC circuit #N 133-N, and outputs the signal from which the N SI signals are canceled to the LNA 141. When the analog SIC circuit #1 133-1, the analog SIC circuit #2 133-2, ..., the analog SIC circuit #N 133-N are initially operated, each of the analog SIC circuit #1 133-1, the analog SIC circuit #2 133-2, ..., the analog SIC circuit #N 133-N may not generate a copied-SI signal, or may generate a default copied-SI signal. An operation of generating a copied-SI signal in each of the analog SIC circuit #1 133-1, the analog SIC circuit #2 133-2, ..., the analog SIC circuit #N 133-N will be described below, so a detailed description thereof will be omitted herein.

The LNA 141 low noise amplifies the signal output from the combiner 131 with a preset gain, and outputs the low noise amplified signal to the frequency down-converter 143. The frequency down-converter 143 down-converts a frequency of the signal output from the LNA 141 to output the down-converted signal to the ADC 145. The ADC 145 converts the signal output from the frequency down-converter 143 into a digital signal to output the digital signal to the multi-path SI estimator 147 and the combiner 115. The combiner 115 combines the signal output from the digital SIC unit 113 and the signal output from the ADC 145 to output the combined signal.

When the signal output from the ADC 145 is input to the multi-path SI estimator 147, the signal output from the ADC 145 is input to the power delay profile estimator 149. The power delay profile estimator 149 estimates a power delay profile for the signal output from the ADC 145 to output the estimated power delay profile to the multi-path SI controller 151. The multi-path SI controller 151 controls each of the analog SIC circuit #1 133-1, the analog SIC circuit #2 133-2, ..., the analog SIC circuit #N 133-N based on the power delay profile output from the power delay profile estimator 149. That is, the multi-path SI controller 151 controls a variable gain controller, a variable phase controller, and a variable delay controller included in each of the analog SIC circuit #1 133-1, the analog SIC circuit #2 133-2, ..., the analog SIC circuit #N 133-N based on the power delay profile output from the power delay profile estimator 149. So, each of the analog SIC circuit #1 133-1, the analog SIC circuit #2 133-2, ..., the analog SIC circuit #N 133-N generates a copied-SI signal under a control of the multi-path SI controller 151.

When a signal to be transmitted in the SIC apparatus occurs, the transmission signal is input to the pre-filtering unit 111, and the pre-filtering unit 111 performs a pre-filtering operation on the transmission signal to output the pre-filtered signal to the DAC 117. The pre-filtering operation will be described below, so a detailed description thereof will be omitted herein.

The DAC 117 converts the signal output from the pre-filtering unit 111 into an analog signal to output the analog signal to the frequency up-converter 119. The frequency up-converter 119 up-converts a frequency of the signal output from the DAC 117 to output the up-converted signal to the PA 121. The PA 121 amplifies the signal output from the frequency up-converter 119 corresponding to a preset gain to output the amplified signal to the coupler 123. The coupler 123 performs a coupling operation on the signal output from the PA 121 to output the coupled signal to the circulator/duplexer 125 and each of the analog SIC circuit #1 133-1, the analog SIC circuit #2 133-2, ..., the analog SIC circuit #N 133-N.

After inputting the signal output from the coupler 123, each of the analog SIC circuit #1 133-1, the analog SIC circuit #2 133-2, ..., the analog SIC circuit #N 133-N generates a copied-SI signal by operating a variable gain controller, a variable phase controller, and a variable delay controller included in each of the analog SIC circuit #1 133-1, the analog SIC circuit #2 133-2, ..., the analog SIC circuit #N 133-N under a control of the multi-path SI controller 151 to control a gain, a phase, and delay thereof, and outputs the copied-SI signal to the combiner 131.

As a result, an SIC apparatus as described in FIG. 1 enables to perform an SIC operation after firstly cancelling N SI signals that strength is maximum from a reception signal.

While the pre-filtering unit 111, the digital SIC unit 113, the combiner 115, the DAC 117, the frequency up-converter 119, the PA 121, the coupler 123, the circulator/duplexer 125, the antenna 127, the variable attenuator 129, the combiner 131, the analog SIC circuit #1 133-1, the analog SIC circuit #2 133-2, ..., the analog SIC circuit #N 133-N, the LNA 141, the frequency down-converter 143, the ADC 145, and the multi-path SI estimator 147 are described in the SIC apparatus as separate processing units, it is to be understood that this is merely for convenience of description. In other words, two or more of the pre-filtering unit 111, the digital SIC unit 113, the combiner 115, the DAC 117, the frequency up-converter 119, the PA 121, the coupler 123, the circulator/duplexer 125, the antenna 127, the variable attenuator 129, the combiner 131, the analog SIC circuit #1 133-1, the analog SIC circuit #2 133-2, ..., the analog SIC circuit #N 133-N, the LNA 141, the frequency down-converter 143, the ADC 145, and the multi-path SI estimator 147 may be incorporated into a single unit.

The SIC apparatus may be implemented with one processor.

While a variable gain controller, a variable phase controller, and a variable delay controller are described in each of the analog SIC circuit #1 133-1, the analog SIC circuit #2 133-2, ..., the analog SIC circuit #N 133-N as separate processing units, it is to be understood that this is merely for convenience of description. In other words, two or more of the variable gain controller, the variable phase controller, and the variable delay controller may be incorporated into a single unit in each of the analog SIC circuit #1 133-1, the analog SIC circuit #2 133-2, . . . , the analog SIC circuit #N 133-N.

Each of the analog SIC circuit #1 133-1, the analog SIC circuit #2 133-2, . . . , the analog SIC circuit #N 133-N may be implemented with one processor.

While the power delay profile estimator 149 and the multi-path SI controller 151 are described in the multi-path SI estimator 147 as separate processing units, it is to be understood that this is merely for convenience of description. In other words, the multi-path SI estimator 147 may be implemented with one processor.

An example of an inner structure of an SIC apparatus in a full-duplex communication system according to an embodiment of the present disclosure has been described with reference to FIG. 1, and another example of an inner structure of an SIC apparatus in a full-duplex communication system according to an embodiment of the present disclosure will be described with reference to FIG. 2.

Figure 2:
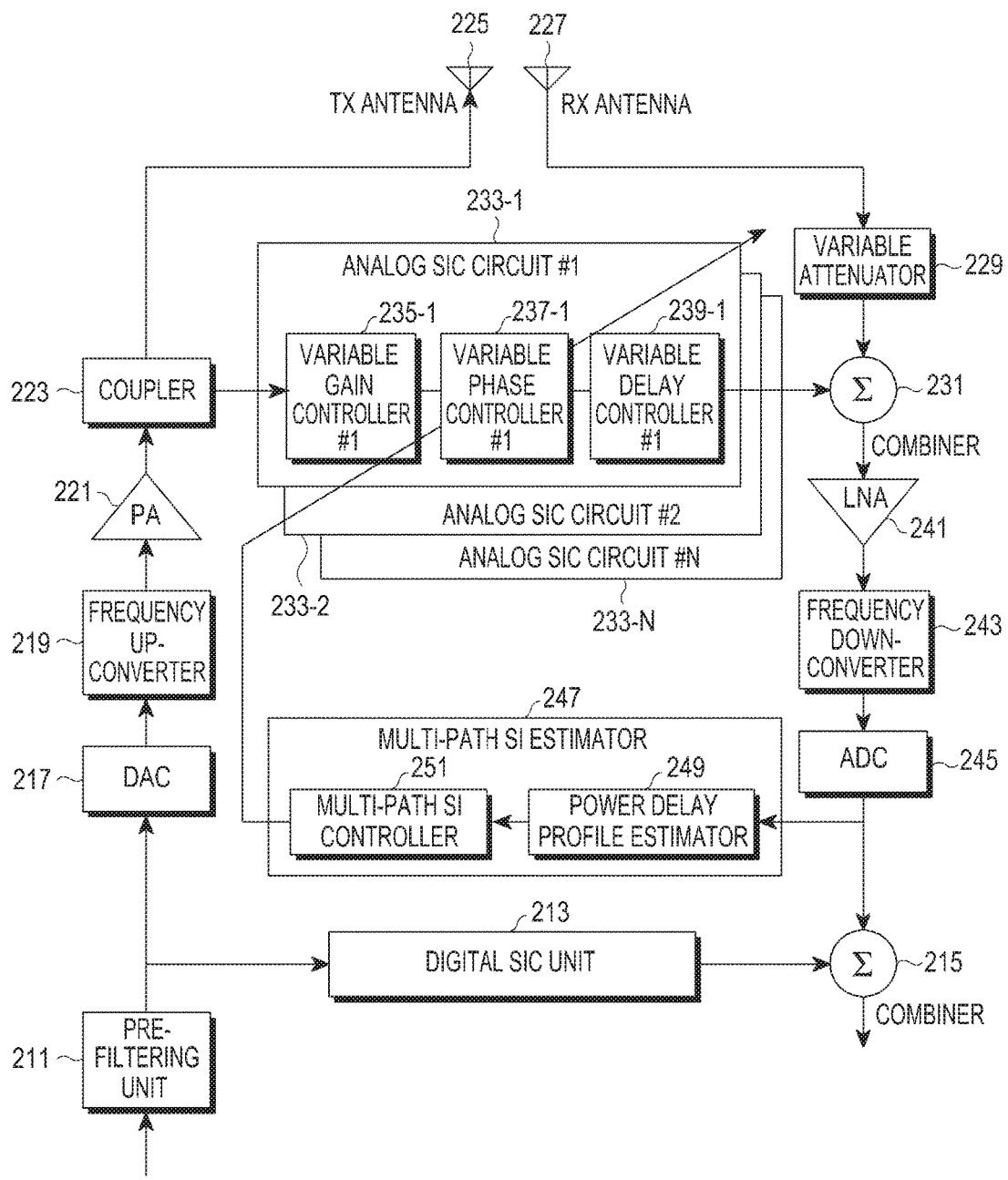
FIG. 2 schematically illustrates another example of an inner structure of an SIC apparatus in a full-duplex communication system according to an embodiment of the present disclosure.

FIG. 2 schematically illustrates another example of an inner structure of an SIC apparatus in a full-duplex communication system according to an embodiment of the present disclosure.

Referring to FIG. 2, it will be noted that an SIC apparatus in FIG. 2 is an SIC apparatus in a case that a Tx antenna and an Rx antenna are implemented as separate antennas, and a combiner for combining copied-SI signals and a reception signal is located before an LNA included in a receiver.

The SIC apparatus includes a pre-filtering unit 211, a digital SIC unit 213, a combiner 215, a DAC 217, a frequency up-converter 219, a PA 221, a coupler 223, a Tx antenna 225, an Rx antenna 227, a variable attenuator 229, a combiner 231, a plurality of analog SIC circuits, e.g., N analog SIC circuits, i.e., an analog SIC circuit #1 233-1, an analog SIC circuit #2 233-2, . . . , an analog SIC circuit #N 233-N, an LNA 241, a frequency down-converter 243, an ADC 245, and a multi-path SI estimator 247.

Each of the analog SIC circuit #1 233-1, the analog SIC circuit #2 233-2, . . . , the analog SIC circuit #N 233-N includes a variable gain controller, a variable phase controller, and a variable delay controller. That is, the analog SIC circuit #1 233-1 includes a variable gain controller #1 235-1, a variable phase controller #1 237-1, and a variable delay controller #1 239-1. In this way, the analog SIC circuit #N 233-N as the last analog SIC circuit includes a variable gain controller #N 235-N, a variable phase controller #N 237-N, and a variable delay controller #N 239-N.

The multi-path SI estimator 247 includes a power delay profile estimator 249 and a multi-path SI controller 251.

When a signal is received through the Rx antenna 227, the received signal is input to the variable attenuator 229, and the variable attenuator 229 attenuates the signal received through the Rx antenna 227 by applying a preset attenuation value to the signal received through the Rx antenna 227 to output the attenuated signal to the combiner 231. The combiner 231 cancels N SI signals of which strength is maximum among a plurality of SI signals which are received by the SIC apparatus by combining the signal output from the variable attenuator 229 and the copied-SI signals output from the analog SIC circuit #1 233-1, the analog SIC circuit #2 233-2, . . . , the analog SIC circuit #N 233-N, and outputs the signal from which the N SI signals are canceled to the LNA 241.

When the analog SIC circuit #1 233-1, the analog SIC circuit #2 233-2, . . . , the analog SIC circuit #N 233-N are initially operated, each of the analog SIC circuit #1 233-1, the analog SIC circuit #2 233-2, . . . , the analog SIC circuit #N 233-N may not generate a copied-SI signal, or may generate a default copied-SI signal. An operation of generating a copied-SI signal in each of the analog SIC circuit #1 233-1, the analog SIC circuit #2 233-2, . . . , the analog SIC circuit #N 233-N will be described below, so a detailed description thereof will be omitted herein.

The LNA 241 low noise amplifies the signal output from the combiner 231 with a preset gain, and outputs the low noise amplified signal to the frequency down-converter 243. The frequency down-converter 243 down-converts a frequency of the signal output from the LNA 141 to output the down-converted signal to the ADC 245. The ADC 245 converts the signal output from the frequency down-converter 243 into a digital signal to output the digital signal to the multi-path SI estimator 247 and the combiner 215. The combiner 215 combines the signal output from the digital SIC unit 213 and the signal output from the ADC 245 to output the combined signal.

When the signal output from the ADC 245 is input to the multi-path SI estimator 247, the signal output from the ADC 245 is input to the power delay profile estimator 249. The power delay profile estimator 249 estimates power delay profile for the signal output from the ADC 245 to output the estimated power delay profile to the multi-path SI controller 251. The multi-path SI controller 251 controls each of the analog SIC circuit #1 233-1, the analog SIC circuit #2 233-2, . . . , the analog SIC circuit #N 233-N based on the power delay profile output from the power delay profile estimator 249. That is, the multi-path SI controller 251 controls a variable gain controller, a variable phase controller, and a variable delay controller included in each of the analog SIC circuit #1 233-1, the analog SIC circuit #2 233-2, . . . , the analog SIC circuit #N 233-N based on the power delay profile output from the power delay profile estimator 249. So, each of the analog SIC circuit #1 233-1, the analog SIC circuit #2 233-2, . . . , the analog SIC circuit #N 233-N generates a copied-SI signal under a control of the multi-path SI controller 251.

When a signal to be transmitted in the SIC apparatus occurs, the transmission signal is input to the pre-filtering unit 211, and the pre-filtering unit 211 performs a pre-filtering operation on the transmission signal to output the pre-filtered signal to the DAC 217. The pre-filtering operation will be described below, so a detailed description thereof will be omitted herein.

The DAC 217 converts the signal output from the pre-filtering unit 211 into an analog signal to output the analog signal to the frequency up-converter 219. The frequency up-converter 219 up-converts a frequency of the signal output from the DAC 217 to output the up-converted signal to the PA 221. The PA 221 amplifies the signal output from the frequency up-converter 219 corresponding to a preset gain to output the amplified signal to the coupler 223. The coupler 223 performs a coupling operation on the signal output from the PA 221 to output the coupled signal to the Tx antenna 225 and each of the analog SIC circuit #1 233-1, the analog SIC circuit #2 233-2, . . . , the analog SIC circuit #N 233-N.

After inputting the signal output from the coupler 223, each of the analog SIC circuit #1 233-1, the analog SIC circuit #2 233-2, . . . , the analog SIC circuit #N 233-N generates a copied-SI signal by operating a variable gain controller, a variable phase controller, and a variable delay controller included in each of the analog SIC circuit #1 233-1, the analog SIC circuit #2 233-2, . . . , the analog SIC circuit #N 233-N under a control of the multi-path SI controller 251 to control a gain, a phase, and delay thereof, and outputs the copied-SI signal to the combiner 231.

As a result, an SIC apparatus as described in FIG. 2 enables to perform an SIC operation after firstly cancelling N SI signals that strength is maximum from a reception signal.

While the pre-filtering unit 211, the digital SIC unit 213, the combiner 215, the DAC 217, the frequency up-converter 219, the PA 221, the coupler 223, the Tx antenna 225, the Rx antenna 227, the variable attenuator 229, the combiner 231, the analog SIC circuit #1 233-1, the analog SIC circuit #2 233-2, . . . , the analog SIC circuit #N 233-N, the LNA 241, the frequency down-converter 243, the ADC 245, and the multi-path SI estimator 247 are described in the SIC apparatus as separate processing units, it is to be understood that this is merely for convenience of description. In other words, two or more of the pre-filtering unit 211, the digital SIC unit 213, the combiner 215, the DAC 217, the frequency up-converter 219, the PA 221, the coupler 223, the Tx antenna 225, the Rx antenna 227, the variable attenuator 229, the combiner 231, the analog SIC circuit #1 233-1, the analog SIC circuit #2 233-2, . . . , the analog SIC circuit #N 233-N, the LNA 241, the frequency down-converter 243, the ADC 245, and the multi-path SI estimator 247 may be incorporated into a single unit.

The SIC apparatus may be implemented with one processor.

While a variable gain controller, a variable phase controller, and a variable delay controller are described in each of the analog SIC circuit #1 233-1, the analog SIC circuit #2 233-2, . . . , the analog SIC circuit #N 233-N as separate processing units, it is to be understood that this is merely for convenience of description. In other words, two or more of the variable gain controller, the variable phase controller, and the variable delay controller may be incorporated into a single unit in each of the analog SIC circuit #1 233-1, the analog SIC circuit #2 233-2, . . . , the analog SIC circuit #N 233-N.

Each of the analog SIC circuit #1 233-1, the analog SIC circuit #2 233-2, . . . , the analog SIC circuit #N 233-N may be implemented with one processor.

While the power delay profile estimator 249 and the multi-path SI controller 251 are described in the multi-path SI estimator 247 as separate processing units, it is to be understood that this is merely for convenience of description. In other words, the multi-path SI estimator 247 may be implemented with one processor.

Another example of an inner structure of an SIC apparatus in a full-duplex communication system according to an embodiment of the present disclosure has been described with reference to FIG. 2, and still another example of an inner structure of an SIC apparatus in a full-duplex communication system according to an embodiment of the present disclosure will be described with reference to FIG. 3.

Figure 3:
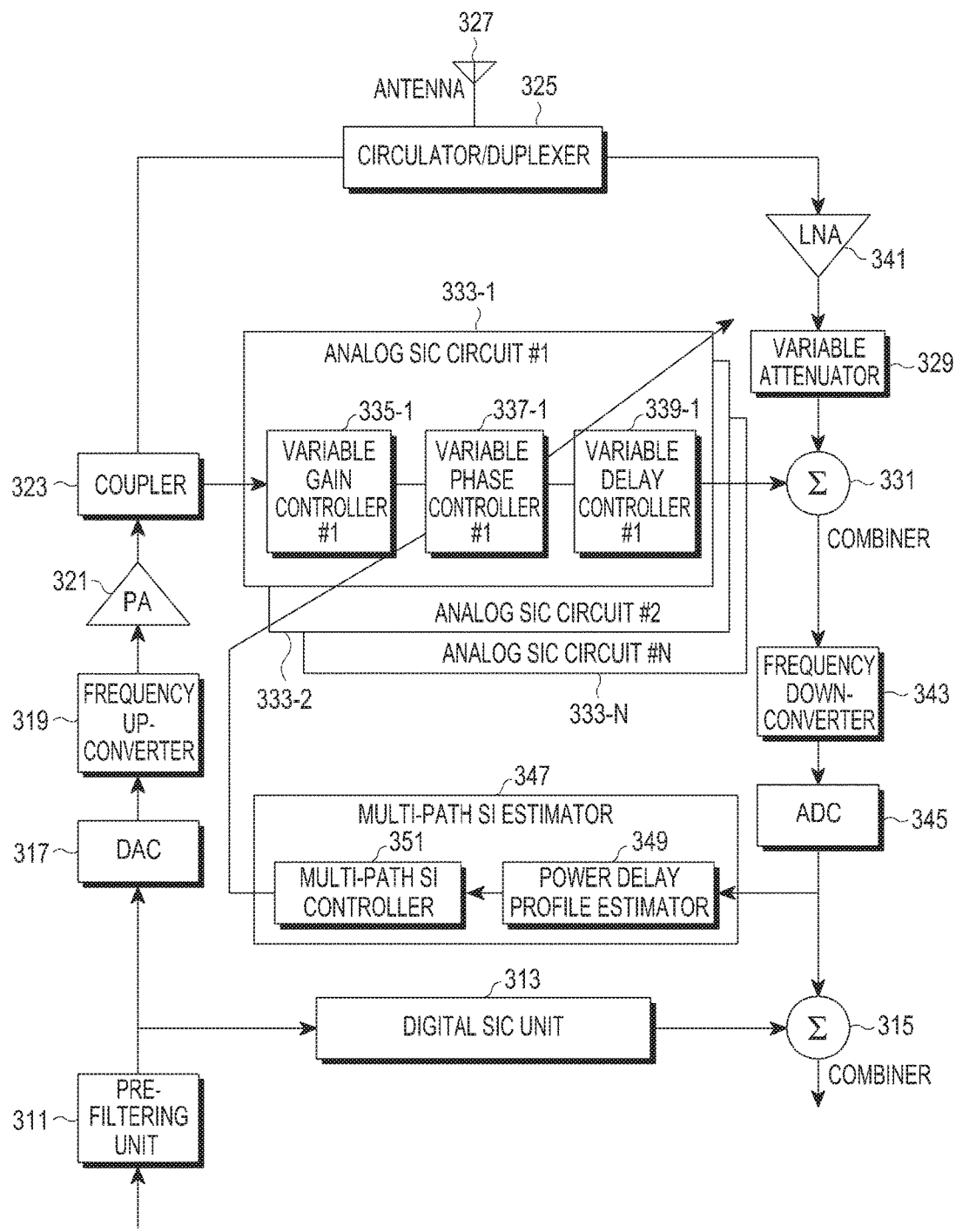
FIG. 3 schematically illustrates another example of an inner structure of an SIC apparatus in a full-duplex communication system according to an embodiment of the present disclosure.

FIG. 3 schematically illustrates another example of an inner structure of an SIC apparatus in a full-duplex communication system according to an embodiment of the present disclosure.

Referring to FIG. 3, it will be noted that an SIC apparatus in FIG. 3 is an SIC apparatus in a case that a Tx antenna and an Rx antenna are implemented as one antenna, and a combiner for combining copied-SI signals and a reception signal is located behind an LNA included in a receiver.

The SIC apparatus includes a pre-filtering unit 311, a digital SIC unit 313, a combiner 315, a DAC 317, a frequency up-converter 319, a PA 321, a coupler 323, a circulator/duplexer 325, an antenna 327, a variable attenuator 329, a combiner 331, a plurality of analog SIC circuits, e.g., N analog SIC circuits, i.e., an analog SIC circuit #1 333-1, an analog SIC circuit #2 333-2, . . . , an analog SIC circuit #N 333-N, an LNA 341, a frequency down-converter 343, an ADC 345, and a multi-path SI estimator 347.

Each of the analog SIC circuit #1 333-1, the analog SIC circuit #2 333-2, . . . , the analog SIC circuit #N 333-N includes a variable gain controller, a variable phase controller, and a variable delay controller. That is, the analog SIC circuit #1 333-1 includes a variable gain controller #1 335-1, a variable phase controller #1 337-1, and a variable delay controller #1 339-1. In this way, the analog SIC circuit #N 333-N as the last analog SIC circuit includes a variable gain controller #N 335-N, a variable phase controller #N 337-N, and a variable delay controller #N 339-N.

The multi-path SI estimator 347 includes a power delay profile estimator 349 and a multi-path SI controller 351.

When a signal is received through the antenna 327, the received signal is input to the circulator/duplexer 325. The circulator/duplexer 325 outputs the signal received through the antenna 327 to the LNA 341, and the LNA 341 low noise amplifies the signal output from the circulator/duplexer 325 with a preset gain to output the amplified signal to the variable attenuator 329. The variable attenuator 329 attenuates the signal output from the LNA 341 by applying a preset attenuation value to the signal output from the LNA 341 to output the attenuated signal to the combiner 331.

The combiner 331 cancels N SI signals of which strength is maximum among a plurality of SI signals which are received by the SIC apparatus by combining the signal output from the variable attenuator 329 and the copied-SI signals output from the analog SIC circuit #1 333-1, the analog SIC circuit #2 333-2, . . . , the analog SIC circuit #N 333-N, and outputs the signal from which the N SI signals are canceled to the frequency down-converter 343.

When the analog SIC circuit #1 333-1, the analog SIC circuit #2 333-2, . . . , the analog SIC circuit #N 333-N are initially operated, each of the analog SIC circuit #1 333-1, the analog SIC circuit #2 333-2, . . . , the analog SIC circuit #N 333-N may not generate a copied-SI signal, or may generate a default copied-SI signal. An operation of generating a copied-SI signal in each of the analog SIC circuit #1 333-1, the analog SIC circuit #2 333-2, . . . , the analog SIC circuit #N 333-N will be described below, so a detailed description thereof will be omitted herein.

The frequency down-converter 343 down-converts a frequency of the signal output from the combiner 331 to output the down-converted signal to the ADC 345. The ADC 345 converts the signal output from the frequency down-converter 343 into a digital signal to output the digital signal to the multi-path SI estimator 347 and the combiner 315. The combiner 315 combines the signal output from the digital SIC unit 313 and the signal output from the ADC 345 to output the combined signal.

When the signal output from the ADC 345 is input to the multi-path SI estimator 347, the signal output from the ADC 345 is input to the power delay profile estimator 349. The power delay profile estimator 349 estimates a power delay profile for the signal output from the ADC 345 to output the estimated power delay profile to the multi-path SI controller 351. The multi-path SI controller 351 controls each of the analog SIC circuit #1 333-1, the analog SIC circuit #2 333-2, . . . , the analog SIC circuit #N 333-N based on the power delay profile output from the power delay profile estimator 349. That is, the multi-path SI controller 351 controls a variable gain controller, a variable phase controller, and a variable delay controller included in each of the analog SIC circuit #1 333-1, the analog SIC circuit #2 333-2, . . . , the analog SIC circuit #N 333-N based on the power delay profile output from the power delay profile estimator 349. So, each of the analog SIC circuit #1 333-1, the analog SIC circuit #2 333-2, . . . , the analog SIC circuit #N 333-N generates a copied-SI signal under a control of the multi-path SI controller 351.

When a signal to be transmitted in the SIC apparatus occurs, the transmission signal is input to the pre-filtering unit 311, and the pre-filtering unit 311 performs a pre-filtering operation on the transmission signal to output the pre-filtered signal to the DAC 317. The pre-filtering operation will be described below, so a detailed description thereof will be omitted herein.

The DAC 317 converts the signal output from the pre-filtering unit 311 into an analog signal to output the analog signal to the frequency up-converter 319. The frequency up-converter 319 up-converts a frequency of the signal output from the DAC 317 to output the up-converted signal to the PA 321. The PA 321 amplifies the signal output from the frequency up-converter 319 corresponding to a preset gain to output the amplified signal to the coupler 323. The coupler 323 performs a coupling operation on the signal output from the PA 321 to output the coupled signal to the circulator/duplexer 325 and each of the analog SIC circuit #1 333-1, the analog SIC circuit #2 333-2, . . . , the analog SIC circuit #N 333-N.

After inputting the signal output from the coupler 323, each of the analog SIC circuit #1 333-1, the analog SIC circuit #2 333-2, . . . , the analog SIC circuit #N 333-N generates a copied-SI signal by operating a variable gain controller, a variable phase controller, and a variable delay controller included in each of the analog SIC circuit #1 333-1, the analog SIC circuit #2 333-2, . . . , the analog SIC circuit #N 333-N under a control of the multi-path SI controller 351 to control a gain, a phase, and delay thereof, and outputs the copied-SI signal to the combiner 331.

As a result, an SIC apparatus as described in FIG. 3 enables to perform an SIC operation after firstly cancelling N SI signals that strength is maximum from a reception signal.

While the pre-filtering unit 311, the digital SIC unit 313, the combiner 315, the DAC 317, the frequency up-converter 319, the PA 321, a coupler 323, the circulator/duplexer 325, the antenna 327, the variable attenuator 329, the combiner 331, the analog SIC circuit #1 333-1, the analog SIC circuit #2 333-2, . . . , the analog SIC circuit #N 333-N, the LNA 341, the frequency down-converter 343, the ADC 345, and the multi-path SI estimator 347 are described in the SIC apparatus as separate processing units, it is to be understood that this is merely for convenience of description. In other words, two or more of the pre-filtering unit 311, the digital SIC unit 313, the combiner 315, the DAC 317, the frequency up-converter 319, the PA 321, a coupler 323, the circulator/duplexer 325, the antenna 327, the variable attenuator 329, the combiner 331, the analog SIC circuit #1 333-1, the analog SIC circuit #2 333-2, . . . , the analog SIC circuit #N 333-N, the LNA 341, the frequency down-converter 343, the ADC 345, and the multi-path SI estimator 347 may be incorporated into a single unit.

The SIC apparatus may be implemented with one processor.

While a variable gain controller, a variable phase controller, and a variable delay controller are described in each of the analog SIC circuit #1 333-1, the analog SIC circuit #2 333-2, . . . , the analog SIC circuit #N 333-N as separate processing units, it is to be understood that this is merely for convenience of description. In other words, two or more of the variable gain controller, the variable phase controller, and the variable delay controller may be incorporated into a single unit in each of the analog SIC circuit #1 333-1, the analog SIC circuit #2 333-2, . . . , the analog SIC circuit #N 333-N.

Each of the analog SIC circuit #1 333-1, the analog SIC circuit #2 333-2, . . . , the analog SIC circuit #N 333-N may be implemented with one processor.

While the power delay profile estimator 349 and the multi-path SI controller 351 are described in the multi-path SI estimator 347 as separate processing units, it is to be understood that this is merely for convenience of description. In other words, the multi-path SI estimator 347 may be implemented with one processor.

Another example of an inner structure of an SIC apparatus in a full-duplex communication system according to an embodiment of the present disclosure has been described with reference to FIG. 3, and still another example of an inner structure of an SIC apparatus in a full-duplex communication system according to an embodiment of the present disclosure will be described with reference to FIG. 4.

Figure 4:
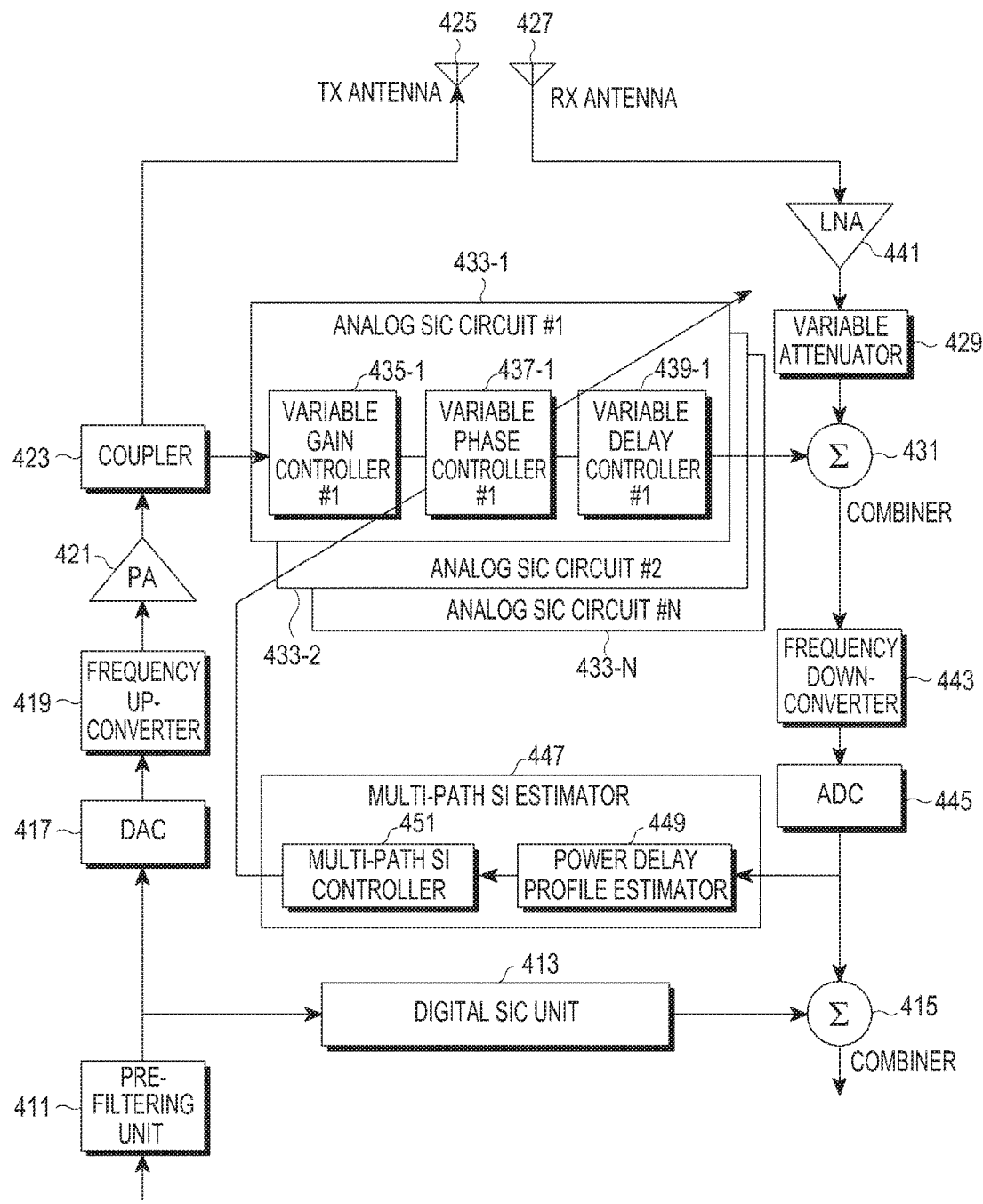
FIG. 4 schematically illustrates another example of an inner structure of an SIC apparatus in a full-duplex communication system according to an embodiment of the present disclosure.

FIG. 4 schematically illustrates another example of an inner structure of an SIC apparatus in a full-duplex communication system according to an embodiment of the present disclosure.

Referring to FIG. 4, it will be noted that an SIC apparatus in FIG. 4 is an SIC apparatus in a case that a Tx antenna and an Rx antenna are implemented as separate antennas, and a combiner for combining copied-SI signals and a reception signal is located behind an LNA included in a receiver.

The SIC apparatus includes a pre-filtering unit 411, a digital SIC unit 413, a combiner 415, a DAC 417, a frequency up-converter 419, a PA 421, a coupler 423, a Tx antenna 425, an Rx antenna 427, a variable attenuator 429, a combiner 431, a plurality of analog SIC circuits, e.g., N analog SIC circuits, i.e., an analog SIC circuit #1 433-1, an analog SIC circuit #2 433-2, . . . , an analog SIC circuit #N 433-N, an LNA 441, a frequency down-converter 443, an ADC 445, and a multi-path SI estimator 447.

Each of the analog SIC circuit #1 433-1, the analog SIC circuit #2 433-2, . . . , the analog SIC circuit #N 433-N includes a variable gain controller, a variable phase controller, and a variable delay controller. That is, the analog SIC circuit #1 433-1 includes a variable gain controller #1 435-1, a variable phase controller #1 437-1, and a variable delay controller #1 439-1. In this way, the analog SIC circuit #N 433-N as the last analog SIC circuit includes a variable gain controller #N 435-N, a variable phase controller #N 437-N, and a variable delay controller #N 439-N.

The multi-path SI estimator 447 includes a power delay profile estimator 449 and a multi-path SI controller 451.

When a signal is received through the Rx antenna 427, the signal received through the Rx antenna 427 is input to the LNA 441, and the LNA 441 low noise amplifies the signal received through the Rx antenna 427 with a preset gain to output the low noise amplified signal to the variable attenuator 429. The variable attenuator 429 attenuates the signal output from the LNA 441 by applying a preset attenuation value to the signal output from the LNA 441 to output the attenuated signal to the combiner 431. The combiner 431 cancels N SI signals of which strength is maximum among a plurality of SI signals which are received by the SIC apparatus by combining the signal output from the variable attenuator 429 and the copied-SI signals output from the analog SIC circuit #1 433-1, the analog SIC circuit #2 433-2, . . . , the analog SIC circuit #N 433-N, and outputs the signal from which the N SI signals are canceled to the frequency down-converter 443.

When the analog SIC circuit #1 433-1, the analog SIC circuit #2 433-2, . . . , the analog SIC circuit #N 433-N are initially operated, each of the analog SIC circuit #1 433-1, the analog SIC circuit #2 433-2, . . . , the analog SIC circuit #N 433-N may not generate a copied-SI signal, or may generate a default copied-SI signal. An operation of generating a copied-SI signal in each of the analog SIC circuit #1 433-1, the analog SIC circuit #2 433-2, . . . , the analog SIC circuit #N 433-N will be described below, so a detailed description thereof will be omitted herein.

The frequency down-converter 443 down-converts a frequency of the signal output from the combiner 431 to output the down-converted signal to the ADC 445. The ADC 445 converts the signal output from the frequency down-converter 443 into a digital signal to output the digital signal to the multi-path SI estimator 447 and the combiner 415. The combiner 415 combines the signal output from the digital SIC unit 413 and the signal output from the ADC 445 to output the combined signal.

When the signal output from the ADC 445 is input to the multi-path SI estimator 447, the signal output from the ADC 445 is input to the power delay profile estimator 449. The power delay profile estimator 449 estimates a power delay profile for the signal output from the ADC 445 to output the estimated power delay profile to the multi-path SI controller 451. The multi-path SI controller 451 controls each of the analog SIC circuit #1 433-1, the analog SIC circuit #2 433-2, . . . , the analog SIC circuit #N 433-N based on the power delay profile output from the power delay profile estimator 449. That is, the multi-path SI controller 451 controls a variable gain controller, a variable phase controller, and a variable delay controller included in each of the analog SIC circuit #1 433-1, the analog SIC circuit #2 433-2, . . . , the analog SIC circuit #N 433-N based on the power delay profile output from the power delay profile estimator 449. So, each of the analog SIC circuit #1 433-1, the analog SIC circuit #2 433-2, . . . , the analog SIC circuit #N 433-N generates a copied-SI signal under a control of the multi-path SI controller 451.

When a signal to be transmitted in the SIC apparatus occurs, the transmission signal is input to the pre-filtering unit 411, and the pre-filtering unit 411 performs a pre-filtering operation on the transmission signal to output the pre-filtered signal to the DAC 417. The pre-filtering operation will be described below, so a detailed description thereof will be omitted herein.

The DAC 417 converts the signal output from the pre-filtering unit 411 into an analog signal to output the analog signal to the frequency up-converter 419. The frequency up-converter 419 up-converts a frequency of the signal output from the DAC 417 to output the up-converted signal to the PA 421. The PA 421 amplifies the signal output from the frequency up-converter 419 corresponding to a preset gain to output the amplified signal to the coupler 423. The coupler 423 performs a coupling operation on the signal output from the PA 421 to output the coupled signal to the Tx antenna 425 and each of the analog SIC circuit #1 433-1, the analog SIC circuit #2 433-2, . . . , the analog SIC circuit #N 433-N.

After inputting the signal output from the coupler 423, each of the analog SIC circuit #1 433-1, the analog SIC circuit #2 433-2, . . . , the analog SIC circuit #N 433-N generates a copied-SI signal by operating a variable gain controller, a variable phase controller, and a variable delay controller included in each of the analog SIC circuit #1 433-1, the analog SIC circuit #2 433-2, . . . , the analog SIC circuit #N 433-N under a control of the multi-path SI controller 451 to control a gain, a phase, and delay thereof, and outputs the copied-SI signal to the combiner 431.

As a result, an SIC apparatus as described in FIG. 4 enables to perform an SIC operation after firstly cancelling N SI signals that strength is maximum from a reception signal.

While the pre-filtering unit 411, the digital SIC unit 413, the combiner 415, the DAC 417, the frequency up-converter 419, the PA 421, the coupler 423, the Tx antenna 425, the Rx antenna 427, the variable attenuator 429, the combiner 431, the analog SIC circuit #1 433-1, the analog SIC circuit #2 433-2, . . . , the analog SIC circuit #N 433-N, the LNA 441, the frequency down-converter 443, the ADC 445, and the multi-path SI estimator 447 are described in the SIC apparatus as separate processing units, it is to be understood that this is merely for convenience of description. In other words, two or more of the pre-filtering unit 411, the digital SIC unit 413, the combiner 415, the DAC 417, the frequency up-converter 419, the PA 421, the coupler 423, the Tx antenna 425, the Rx antenna 427, the variable attenuator 429, the combiner 431, the analog SIC circuit #1 433-1, the analog SIC circuit #2 433-2, . . . , the analog SIC circuit #N 433-N, the LNA 441, the frequency down-converter 443, the ADC 445, and the multi-path SI estimator 447 may be incorporated into a single unit.

The SIC apparatus may be implemented with one processor.

While a variable gain controller, a variable phase controller, and a variable delay controller are described in each of the analog SIC circuit #1 433-1, the analog SIC circuit #2 433-2, . . . , the analog SIC circuit #N 433-N as separate processing units, it is to be understood that this is merely for convenience of description. In other words, two or more of the variable gain controller, the variable phase controller, and the variable delay controller may be incorporated into a single unit in each of the analog SIC circuit #1 433-1, the analog SIC circuit #2 433-2, . . . , the analog SIC circuit #N 433-N.

Each of the analog SIC circuit #1 433-1, the analog SIC circuit #2 433-2, . . . , the analog SIC circuit #N 433-N may be implemented with one processor.

While the power delay profile estimator 449 and the multi-path SI controller 451 are described in the multi-path SI estimator 447 as separate processing units, it is to be understood that this is merely for convenience of description. In other words, the multi-path SI estimator 447 may be implemented with one processor.

Meanwhile, amplitude, a phase, and delay time of each of SI signals are estimated after the SI signals are converted into digital signals, so an SIC apparatus may estimate SI signals which occur due to a transmission signal of the SIC apparatus without performing an operation for transmitting and receiving a signal with other entities while estimating a characteristic of each of the SI signals in order to exactly estimate each of the SI signals.

A variable attenuator is included in a receiver of the SIC apparatus thereby the SIC apparatus may estimate strength of an SI signal by gradually increasing a gain from the lowest gain in a process for estimating the SI signal in order to estimate the SI signal with random strength.

The SIC apparatus performs a pre-filtering operation using a pre-filtering unit in order to decrease the number of SI signals which will be cancelled using a finite number of analog SIC circuits.

An operating process of an SIC apparatus in a communication system supporting a full-duplex scheme according to an embodiment of the present disclosure will be described with reference to FIG. 5.

Figure 5:
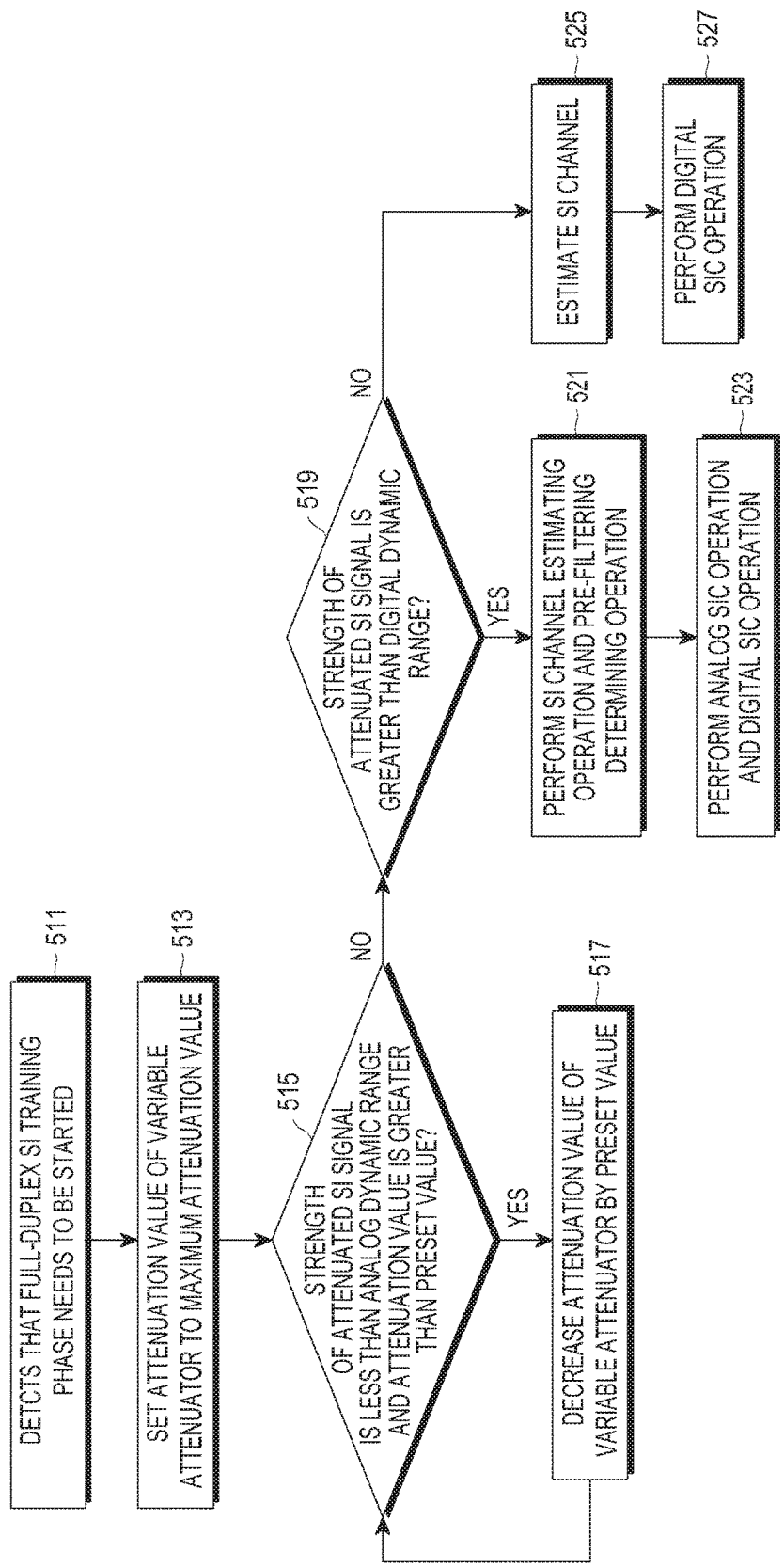
FIG. 5 schematically illustrates an operating process of an SIC apparatus in a communication system supporting a full-duplex scheme according to an embodiment of the present disclosure.

FIG. 5 schematically illustrates an operating process of an SIC apparatus in a communication system supporting a full-duplex scheme according to an embodiment of the present disclosure.

Referring to FIG. 5, the SIC apparatus detects that a full-duplex SI training phase may be started at operation 511. The SIC apparatus sets an attenuation value of a variable attenuator to a maximum attenuation value in order to estimate an SI signal at operation 513. The SIC apparatus increases strength of a received SI signal by decreasing the attenuation value of the variable attenuator. The strength of the SI signal may be increased up to an analog dynamic range that a receiver may receive a signal. In a case that the strength of the SI signal is not increased to the analog dynamic range even though the attenuation value is decreased to a range that the variable attenuator may not operate, the SIC apparatus may terminate a control for the attenuation value of the variable attenuator. This case may occur when strength of a received SI signal is less than a reception range of the communication system supporting the full-duplex scheme.

Meanwhile, the SIC apparatus determines whether strength of an SI signal of which a gain is adjusted using the variable attenuator, i.e., strength of an SI signal which is attenuated using the variable attenuator is less than the analog dynamic range and the attenuation value is greater than a preset value, e.g., "0" at operation 515. If the strength of the attenuated SI signal is less than the analog dynamic range and the attenuation value is greater than 0, the SIC apparatus decreases the attenuation value of the variable attenuator by a preset value at operation 517.

If the strength of the attenuated SI signal is not less than the analog dynamic range, that is, the strength of the attenuated SI signal is greater than or equal to the analog dynamic range, and the attenuation value is not greater than 0, the SIC apparatus determines whether the strength of the attenuated SI signal is greater than a digital dynamic range of the receiver at operation 519.

If the strength of the attenuated SI signal is greater than the digital dynamic range, the SIC apparatus performs an SI channel estimating operation and a pre-filtering determining operation at operation 521. The SI channel estimating operation and the pre-filtering determining operation will be described below, and a detailed description thereof will be omitted herein. The SIC apparatus performs both an analog SIC operation and a digital SIC operation at operation 523. The analog SIC operation and the digital SIC operation will be described below, and a detailed description thereof will be omitted herein.

If the strength of the attenuated SI signal is not greater than the digital dynamic range, that is, if the strength of the attenuated SI signal is less than or equal to the digital dynamic range, the SIC apparatus estimates an SI channel at operation 525. The SIC apparatus performs the digital SIC operation since there is no need for an SIC operation which is based on an analog SIC operation at operation 527.

Although FIG. 5 illustrates an operating process of an SIC apparatus in a communication system supporting a full-duplex scheme according to an embodiment of the present disclosure, various changes could be made to FIG. 5. For example, although shown as a series of operations, various operations in FIG. 5 could overlap, occur in parallel, occur in a different order, or occur multiple times.

An operating process of an SIC apparatus in a communication system supporting a full-duplex scheme according to an embodiment of the present disclosure has been described with reference to FIG. 5, and an example of effect according to a pre-filtering scheme in a communication system supporting a full-duplex scheme according to an embodiment of the present disclosure will be described with reference to FIG. 6.

Figure 6:
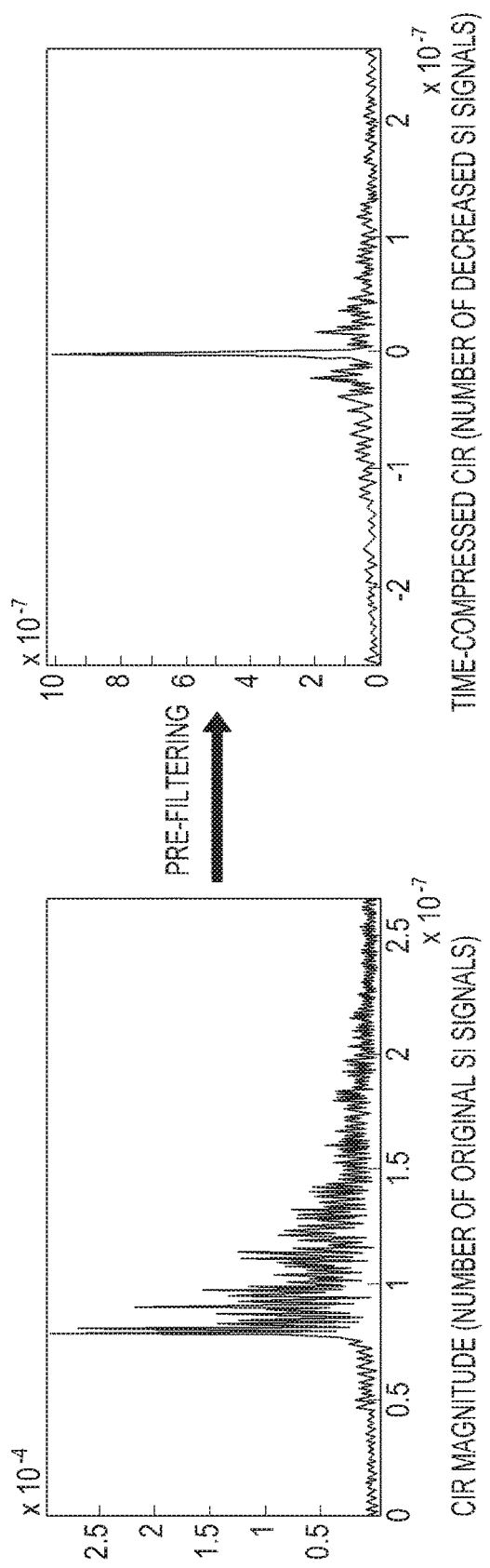
FIG. 6 schematically illustrates an example of effect according to a pre-filtering scheme in a communication system supporting a full-duplex scheme according to an embodiment of the present disclosure.

FIG. 6 schematically illustrates an example of effect according to a pre-filtering scheme in a communication system supporting a full-duplex scheme according to an embodiment of the present disclosure.

Referring to FIG. 6, a pre-filtering scheme for decreasing the number of SI signals, e.g., a pre-filtering scheme for minimizing the number of SI signals is a scheme for acquiring a pre-filter which is time reverse for a channel estimated based on a reception signal as a signal which is received in an SIC apparatus after being reflected from a transmission signal transmitted by the SIC apparatus, i.e., an SI channel and is a complex conjugate, and filtering a transmission signal based the acquired pre-filter.

If the pre-filter is applied, a reception signal which is input to the SIC apparatus as an SI signal has an effect which the reception signal is passed through two types of channels as expressed in Equation 1.

$$s(r, \tau) \triangleq \underbrace{h^*(r_0, -\tau)}_{\text{Time compressed channel}} * \underbrace{h(r, \tau)}_{\substack{\text{Tx Pre-} \\ \text{filter}}} \quad \underbrace{}_{\substack{\text{Channel} \\ \text{(Reflection channel)}}}$$

Equation 1

In Equation 1, $s(r,\tau)$ is a signal generated by applying a pre-filter to an SI signal and denotes a time-compressed channel. In Equation 1, $h^*(r0, -\tau)$ denotes a transmission pre-filter (Tx pre-filter), i.e., a pre-filter which is applied to a transmission signal, and $h(r, \tau)$ denotes a reflection channel, i.e., an SI channel Here, the time-compressed channel denotes a channel which is compressed in a time axis.

A reception signal as expressed in Equation 1 is compressed in a time axis, so the reception signal may acquire an effect that power is concentrated. So, the SIC apparatus may decrease a plurality of SI signals to the smaller number of SI signals that power is concentrated based on this effect. For example, in a case that M SI signals are initially received, if the pre-filter is applied to the M SI signals, N SI signals that power is concentrated are generated, so the number of SI signals may be decreased. Here, M is greater than N (M>N).

In a case that the number of SI signals is decreased by applying a pre-filtering scheme, the number of analog SIC circuits included in the SIC apparatus may be decreased.

A graph which is illustrated in the left side among graphs in FIG. 6 indicates SI signals before a pre-filtering scheme is applied, and a graph which is illustrated in the right side among the graphs in FIG. 6 indicates SI signals after the pre-filtering scheme is applied. As described in FIG. 6, the number of the SI signals before the pre-filtering scheme is applied is significantly greater than the number of the SI signals after the pre-filtering scheme is applied. That is, if an SIC apparatus configures a pre-filter which is time reverse for an SI channel including a plurality of taps and is a complex conjugate and applies the configured pre-filter to a transmission signal as described in FIG. 6, a reception signal input to the SIC apparatus acquires an effect that power is concentrated on a small number of taps.

An example of effect according to a pre-filtering scheme in a communication system supporting a full-duplex scheme according to an embodiment of the present disclosure has been described with reference to FIG. 6, and a process for configuring a pre-filter in an SIC apparatus in a communication system supporting a full-duplex scheme according to an embodiment of the present disclosure will be described with reference to FIG. 7.

Figure 7:
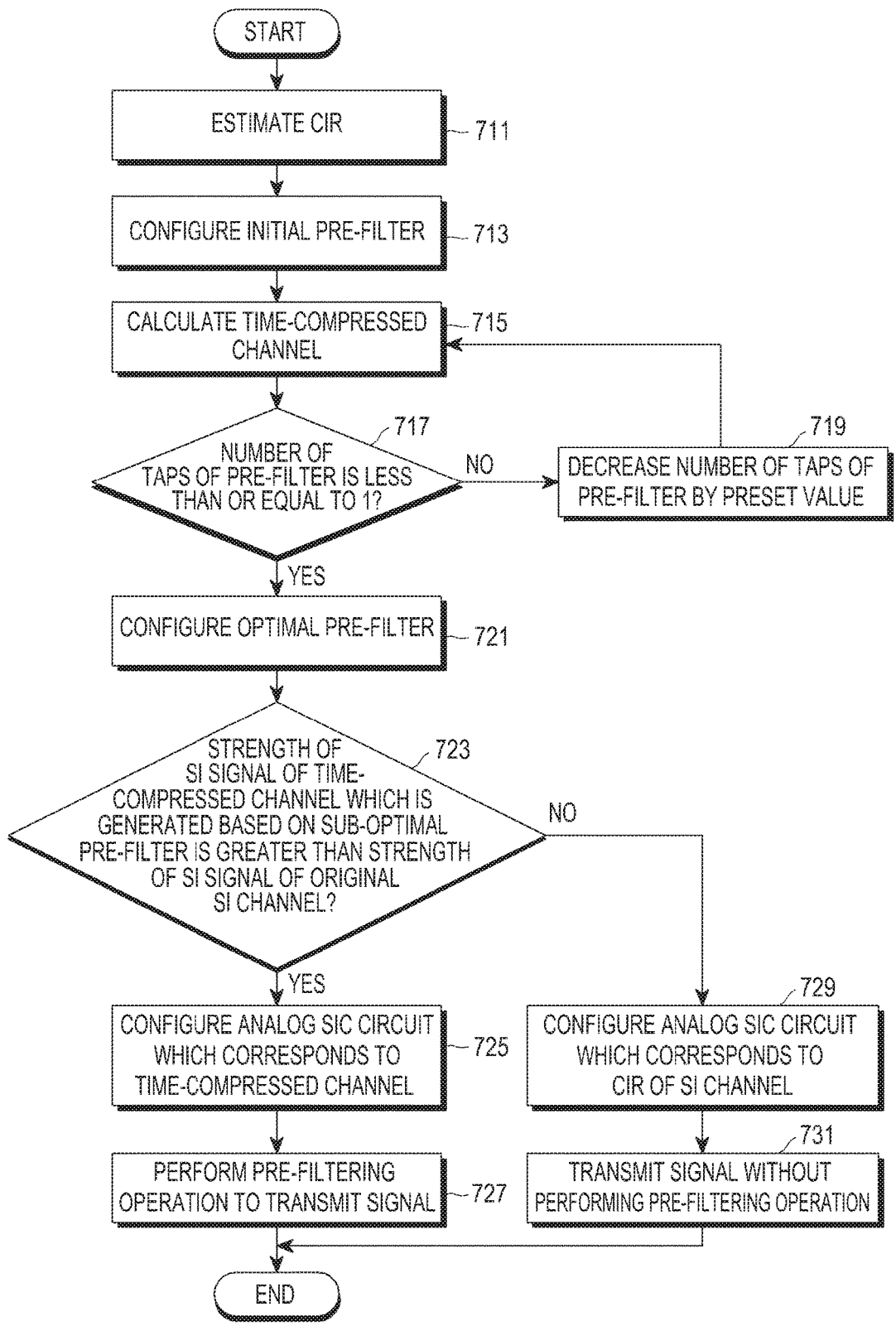
FIG. 7 schematically illustrates a process for configuring a pre-filter in an SIC apparatus in a communication system supporting a full-duplex scheme according to an embodiment of the present disclosure.

FIG. 7 schematically illustrates a process for configuring a pre-filter in an SIC apparatus in a communication system supporting a full-duplex scheme according to an embodiment of the present disclosure.

Referring to FIG. 7, the SIC apparatus estimates a channel impulse response (CIR) for an SI channel at operation 711.

Here, a scheme for estimating the CIR may be implemented with various schemes according to an operating scheme of the communication system supporting the full-duplex scheme, and may be implemented at both a time domain and a frequency domain. For example, if a preamble is used for SI signal training, it is possible to estimate a CIR using a sequence in a time domain. In a communication system supporting a multi-carrier, it is possible to estimate a channel using a reference signal of a frequency domain as well as a time domain in the frequency domain, convert the estimated channel into a channel of the time domain, and estimate a CIR through the channel of the time domain.

The SIC apparatus configures an initial pre-filter at operation 713. The initial pre-filter is configured as a pre-filter including information on all CIRs for the estimated SI channel.

The SIC apparatus calculates a time-compressed channel at operation 715. Here, the time-compressed channel may be acquired by configuring a pre-filter which is time reverse for the estimated CIR and is a complex conjugate in order to cancel an analog SI signal based on a pre-filtering scheme and performing a convolution operation on the configured pre-filter and the estimated CIR.

The SIC apparatus determines whether the number of taps of the pre-filter is less than or equal to 1 at operation 717. If the number of the taps of the pre-filter is not less than or equal to 1, that is, if the number of the taps of the pre-filter is greater than 1, at operation 719 the SIC apparatus decreases the number of the taps of the pre-filter by a preset value, e.g., 1, and returns to operation 715.

If the number of the taps of the pre-filter is less than or equal to 1, the SIC apparatus configures an optimal pre-filter based on the time-compressed channel at operation 721. Here, the optimal pre-filter denotes a pre-filter for minimizing the number of SI signals.

The SIC apparatus calculates a time-compressed channel based on sub-optimal pre-filter as a pre-filter that an effective tap is excluded from the taps of the optimal pre-filter at operation 723. The SIC apparatus determines whether strength of an SI signal of the time-compressed channel which is generated based on the sub-optimal pre-filter is greater than strength of a signal of an original SI channel to which a pre-filter is not applied. The effective tap denotes a tap included in taps of an analog SIC circuit supported in a hardware in a case that taps of an SI channel are ordered by magnitude of power.

The reason why the SIC apparatus determines whether the strength of the SI signal of the time-compressed channel which is generated based on the sub-optimal pre-filter is greater than the strength of the signal of the original SI channel to which the pre-filter is not applied is to determine whether to apply a pre-filtering scheme.

If the strength of the SI signal of the time-compressed channel which is generated based on the sub-optimal pre-filter is greater than the strength of the original SI channel, the SIC apparatus proceeds to operation 725. The SIC apparatus configures an analog SIC circuit which corresponds to a time-compressed channel at operation 725. That is, the SIC apparatus configures a variable gain controller, a variable phase controller, and a variable delay controller which are included in the analog SIC circuit corresponding to the time-compressed channel at operation 725. The SIC apparatus controls a transmitter to transmit a signal after the transmitter performs a pre-filtering operation at operation 727.

If the strength of the SI signal of the time-compressed channel which is generated based on the sub-optimal pre-filter is not greater than the strength of the original SI channel, that is, if the strength of the SI signal of the time-compressed channel which is generated based on the sub-optimal pre-filter is less than or equal to the strength of the original SI channel, the SIC apparatus proceeds to operation 729. The SIC apparatus configures an analog SIC circuit which corresponds to a CIR of the SI channel at operation 729. That is, the SIC apparatus configures a variable gain controller, a variable phase controller, and a variable delay controller which are included in the analog SIC circuit corresponding to the CIR of the SI channel at operation 729. The SIC apparatus controls a transmitter to transmit a signal without performing a pre-filtering operation in the transmitter at operation 731.

Although FIG. 7 illustrates a process for configuring a pre-filter in an SIC apparatus in a communication system supporting a full-duplex scheme according to an embodiment of the present disclosure, various changes could be made to FIG. 7. For example, although shown as a series of operations, various operations in FIG. 7 could overlap, occur in parallel, occur in a different order, or occur multiple times.

A process for configuring a pre-filter in an SIC apparatus in a communication system supporting a full-duplex scheme according to an embodiment of the present disclosure has been described with reference to FIG. 7, and another example of effect according to a pre-filtering scheme in a communication system supporting a full-duplex scheme according to an embodiment of the present disclosure will be described with reference to FIG. 8.

Figure 8:
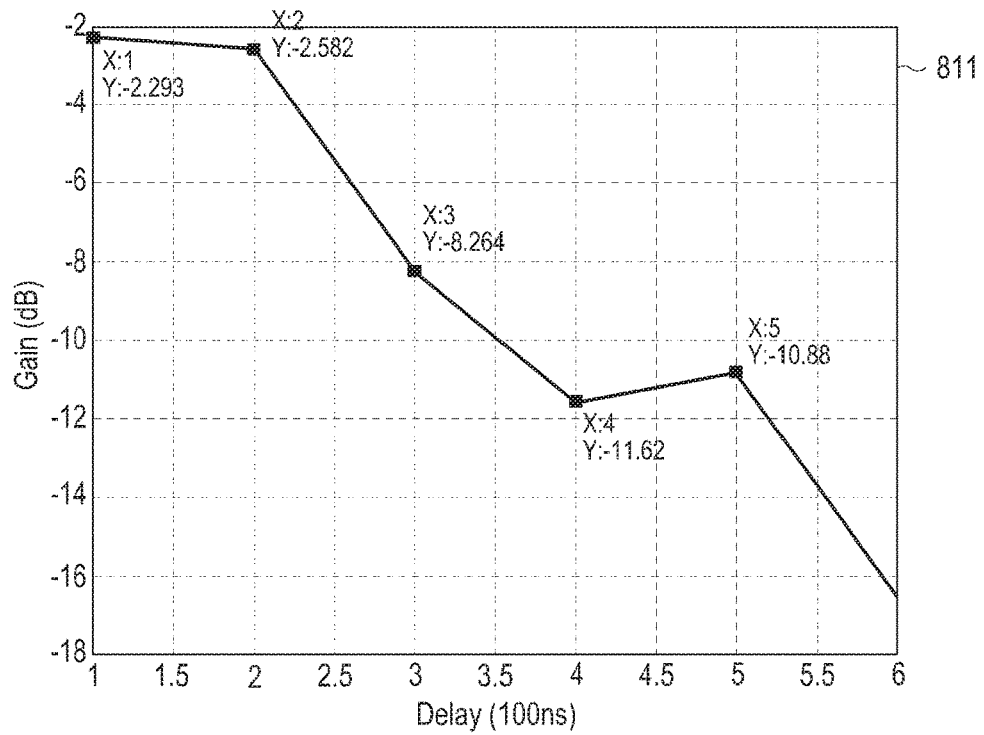
FIG. 8 schematically illustrates another example of effect according to a pre-filtering scheme in a communication system supporting a full-duplex scheme according to an embodiment of the present disclosure.
Figure 8:
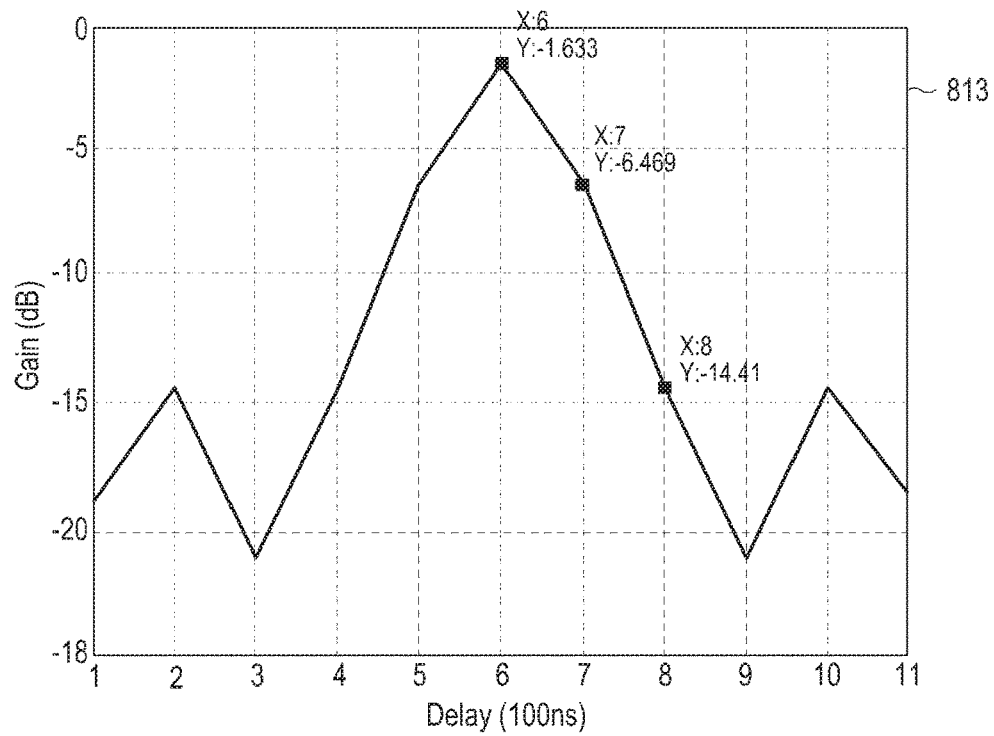

FIG. 8 schematically illustrates another example of effect according to a pre-filtering scheme in a communication system supporting a full-duplex scheme according to an embodiment of the present disclosure.

Referring to FIG. 8, a graph which is illustrated in the left side among graphs in FIG. 8 indicates a gain before a pre-filtering scheme is applied, and a graph which is illustrated in the right side among the graphs in FIG. 8 indicates a gain after the pre-filtering scheme is applied.

For example, in a case that an estimated SI signal is indicated as a graph 811, an analog SIC effect for the first tap is substantially lost due to an SI signal for the second tap even though an analog SI signal for the first tap is cancelled. In this case, if energy of a signal which corresponds to the first tap is increased by applying a pre-filtering scheme, an SIC effect of about 5 dB may be additionally acquired.

For another example, in a case that an estimated SI signal is indicated as a graph 811, if an analog SIC operation is performed for three taps, an SIC effect of about 9 dB may be acquired. Alternatively, if a pre-filtering scheme is applied, an SIC effect of about 13 dB may be acquired as illustrated in a graph 813.

Another example of effect according to a pre-filtering scheme in a communication system supporting a full-duplex scheme according to an embodiment of the present disclosure has been described with reference to FIG. 8, and an environment that a full-duplex node transmits and receives a signal by applying a pre-filtering scheme in a communication system supporting a full-duplex scheme according to an embodiment of the present disclosure will be described with reference to FIG. 9.

Figure 9:
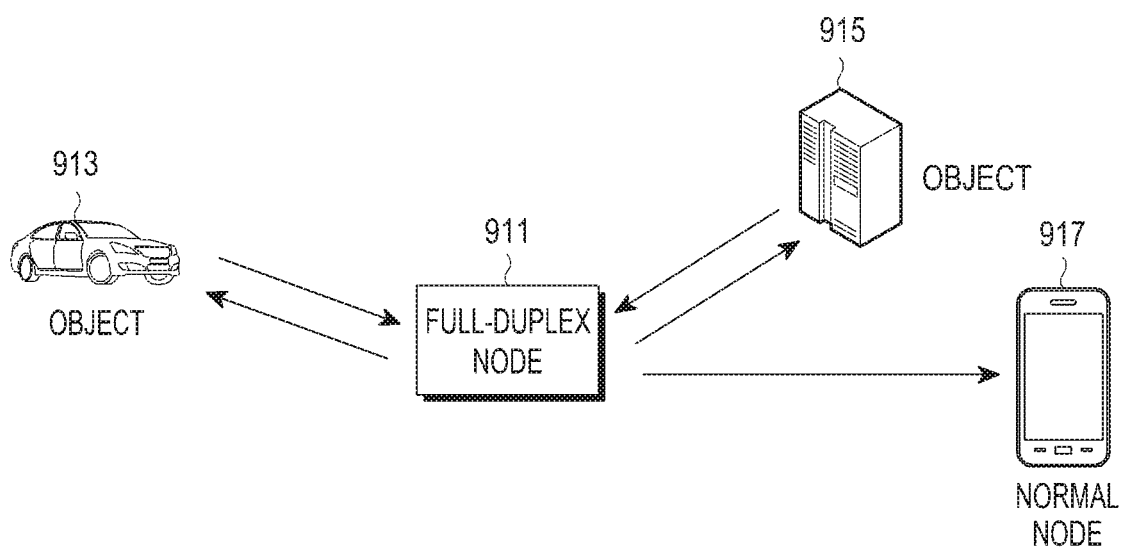
FIG. 9 schematically illustrates an environment that a full-duplex node transmits and receives a signal by applying a pre-filtering scheme in a communication system supporting a full-duplex scheme according to an embodiment of the present disclosure.

FIG. 9 schematically illustrates an environment that a full-duplex node transmits and receives a signal by applying a pre-filtering scheme in a communication system supporting a full-duplex scheme according to an embodiment of the present disclosure.

Referring to FIG. 9, the full-duplex node denotes a node supporting a full-duplex scheme, and it will be assumed that the full-duplex node includes an SIC apparatus proposed in an embodiment of the present disclosure. Further, a normal node denotes a node which does not support the full-duplex scheme.

The communication system supporting the full-duplex scheme includes a full-duplex node 911, objects 913 and 915 which are around the full-duplex node 911, and a normal node 917.

A transmission signal St transmitted by the full-duplex node 911 is received as a form of a reception signal Rx through an SI channel Hr in a receiver included in the full-duplex node 911. The full-duplex node 911 pre-filters the transmission signal St through a pre-filter to transmit the pre-filtered signal, so an SI signal to which a gain similar to a single tap is applied may be received in the receiver included in the full-duplex node 911 and it may be easy to perform an SIC operation based on an analog SIC scheme.

Alternatively, if the full-duplex node 911 applies a pre-filtering scheme to a transmission signal St, a case that a reception channel is spread due to an SI channel Hr-* which is applied to the transmission signal St occurs in a normal node, not a full-duplex node, i.e., the normal node 917.

The full-duplex node 911 may use guard time which corresponds to the reception channel spread or additionally transmit channel information for an equalization operation to the normal node 917 such that a reception performance of the other node, i.e., the normal node 917 is not degraded due to the reception channel spread.

For example, in a communication system supporting an orthogonal frequency division multiplexing (OFDM) scheme, a full-duplex node may extend a length of a used cyclic prefix (CP) to notify the other node of the extended length.

For another example, in a communication system which does not support a CP, e.g., a communication system supporting a filter bank multi carrier (FBMC) scheme, a full-duplex node may transmit information related to delay spread due to a pre-filtering operation performed in the full-duplex node in order to notify the other node that the other node needs to increase an equalization performance.

An environment that a full-duplex node transmits and receives a signal by applying a pre-filtering scheme in a communication system supporting a full-duplex scheme according to an embodiment of the present disclosure has been described with reference to FIG. 9, and a process for transmitting and receiving a signal by applying a pre-filtering scheme in a full duplex node in a communication system supporting a full-duplex scheme according to an embodiment of the present disclosure will be described with reference to FIG. 10.

Figure 10:
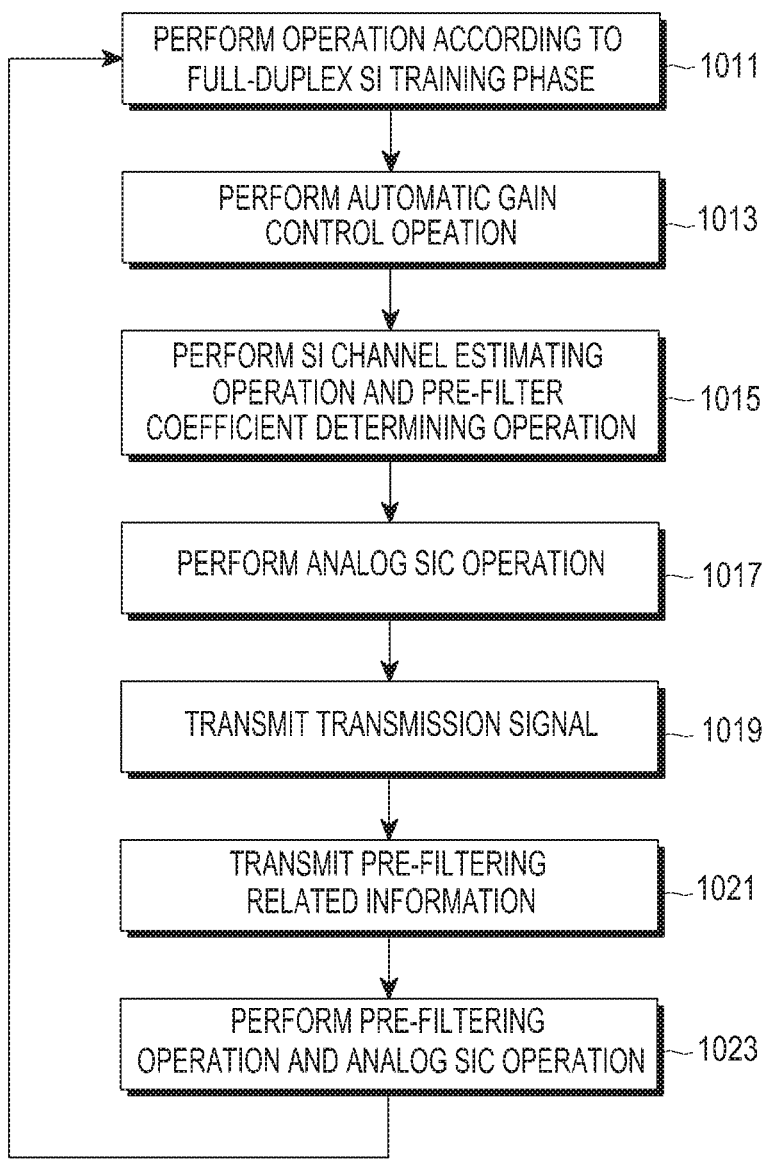
FIG. 10 schematically illustrates a process for transmitting and receiving a signal by applying a pre-filtering scheme in a full-duplex node in a communication system supporting a full-duplex scheme according to an embodiment of the present disclosure.

FIG. 10 schematically illustrates a process for transmitting and receiving a signal by applying a pre-filtering scheme in a full-duplex node in a communication system supporting a full-duplex scheme according to an embodiment of the present disclosure.

Referring to FIG. 10, the full-duplex node performs an operation according to a full-duplex SI training phase at operation 1011. The full-duplex node performs an automatic gain control operation for receiving an SI signal at operation 1013. The automatic gain control operation may be started from a minimum gain and continued until an appropriate gain for the full-duplex node is detected.

The full-duplex node performs an SI channel estimating operation and a pre-filter coefficient determining operation at operation 1015. Further, the full-duplex node estimates a power delay profile at operation 1015. The full-duplex node performs an analog SIC operation at operation 1017. That is, the full-duplex node performs the analog SIC operation by applying a pre-filtering scheme at operation 1017.

The full-duplex node transmits a transmission signal which is generated by performing the analog SIC operation to the other node at operation 1019. The full-duplex node transmits pre-filtering related information to the other node in order to prevent degradation of a reception performance of the other node due to reception channel spread which may occur due to the pre-filtering operation at operation 1021. For example, the pre-filtering related information may be a length of a CP, a delay spread length, or/and the like. The full-duplex node performs a pre-filtering operation and an analog SIC operation for a transmission signal at operation 1023, and returns to operation 1011.

Although FIG. 10 illustrates a process for transmitting and receiving a signal by applying a pre-filtering scheme in a full duplex node in a communication system supporting a full-duplex scheme according to an embodiment of the present disclosure, various changes could be made to FIG. 10. For example, although shown as a series of operations, various operations in FIG. 10 could overlap, occur in parallel, occur in a different order, or occur multiple times.

A process for transmitting and receiving a signal by applying a pre-filtering scheme in a full-duplex node in a communication system supporting a full-duplex scheme according to an embodiment of the present disclosure has been described with reference to FIG. 10, and a signal transmitting/receiving process between a full-duplex node and a normal node in a communication system supporting a full-duplex scheme according to an embodiment of the present disclosure will be described with reference to FIG. 11.

Figure 11:
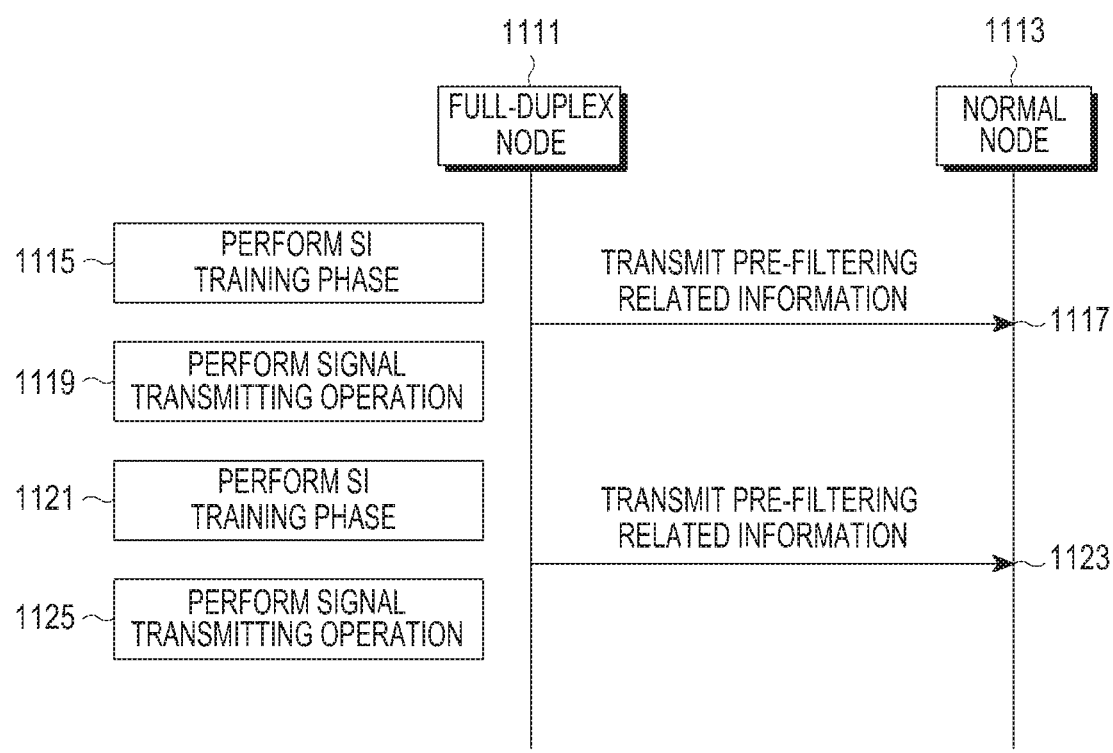
FIG. 11 schematically illustrates a signal transmitting/receiving process between a full-duplex node and a normal node in a communication system supporting a full-duplex scheme according to an embodiment of the present disclosure.

FIG. 11 schematically illustrates a signal transmitting/receiving process between a full-duplex node and a normal node in a communication system supporting a full-duplex scheme according to an embodiment of the present disclosure.

Referring to FIG. 11, the full-duplex communication system includes a full-duplex node 1111 and a normal node 1113.

The full-duplex node 1111 performs a full-duplex SI training phase at operation 1115, and transmits pre-filtering related information to the normal node 1113 at operation 1117. For example, the pre-filtering related information may be a length of a CP, a delay spread length, or/and the like. The full-duplex node 1111 performs a signal transmitting operation after transmitting the pre-filtering related information to the normal node 1113 at operation 1119.

The full-duplex node 1111 performs the full-duplex SI training phase again at operation 1121, and transmits pre-filtering related information to the normal node 1113 at operation 1123. The full-duplex node 1111 performs a signal transmitting operation after transmitting the pre-filtering related information to the normal node 1113 at operation 1125.

A signal transmitting/receiving process between a full-duplex node and a normal node in a communication system supporting a full-duplex scheme according to an embodiment of the present disclosure has been described with reference to FIG. 11, and a process for transmitting/receiving a signal in a case that a 2×2 MIMO scheme is used in a communication system supporting a full-duplex scheme according to an embodiment of the present disclosure will be described with reference to FIG. 12.

Figure 12:
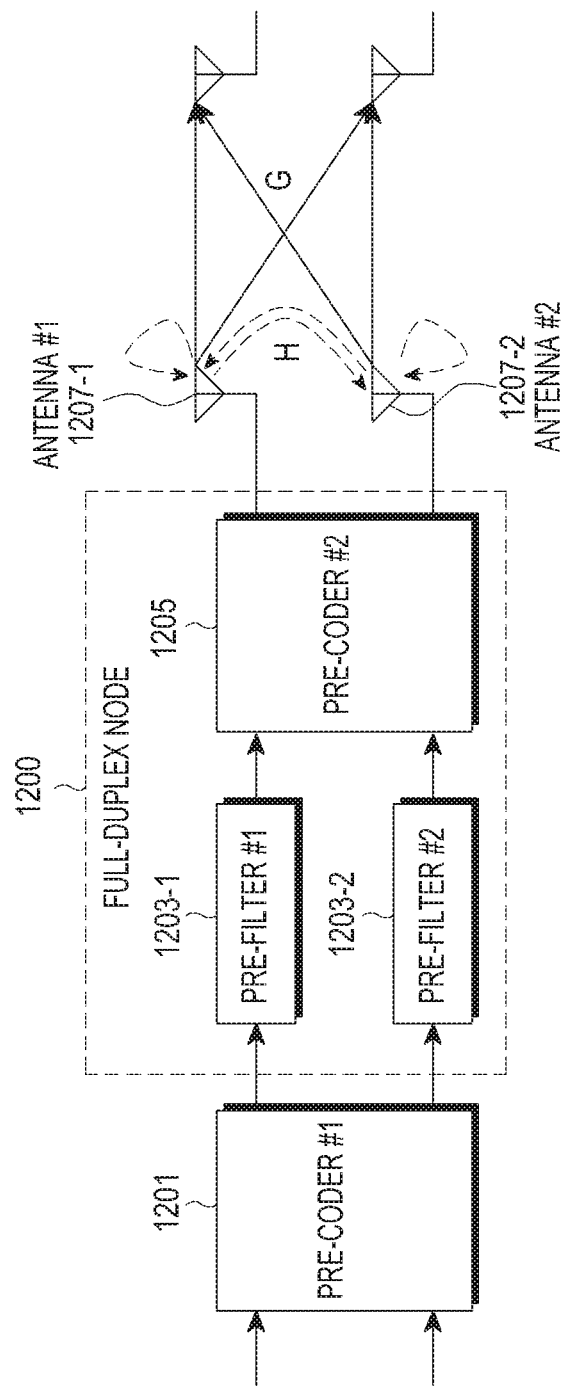
FIG. 12 schematically illustrates a process for transmitting/receiving a signal in a case that a 2×2 multiple input multiple output (MIMO) scheme is used in a communication system supporting a full-duplex scheme according to an embodiment of the present disclosure.

FIG. 12 schematically illustrates a process for transmitting/receiving a signal in a case that a 2×2 MIMO scheme is used in a communication system supporting a full-duplex scheme according to an embodiment of the present disclosure.

Referring to FIG. 12, an SIC scheme which is based on a pre-filtering scheme may be applied to a MIMO scheme. In a case that a full-duplex node uses a MIMO scheme, a Tx antenna and Rx antenna pair interference, self antenna interference, and inter-antenna interference occur according to whether an antenna included in the full-duplex node is implemented as separate antennas such as a Tx antenna and an Rx antenna. Here, the Tx antenna and Rx antenna pair interference denotes interference between a Tx antenna and an Rx antenna.

In a case that an analog SIC scheme which is based on a pre-filtering scheme is applied, an SI signal which occurs in one Tx antenna and Rx antenna pair or a single antenna may be excluded, so an SI signal which occurs since a MIMO scheme is applied is converted into an interference signal among antennas thereby the interference signal may be cancelled using a pre-coding scheme.

A process for transmitting and receiving a signal according a pre-filtering scheme in a case that a 2×2 MIMO scheme is used is illustrated in FIG. 12.

In a case that it will be assumed that an SI channel among antennas which occurs since a MIMO scheme is used is H as described in FIG. 12, the SI channel H may be decomposed into a lower triangular matrix L and an orthogonal matrix Q using LQ decomposition. Here, if $QHL^{-1}$ is multiplied to an LQ matrix acquired through channel estimation through on a pre-coding operation in a full-duplex node thereby the first signal is generated, diagonal elements of an L matrix are multiplied to the first signal thereby the second signal is generated, and the SI channel H is multiplied to the second signal, a remaining SI component except for a channel gain which corresponds to a self antenna is cancelled. So, even though the full-duplex node uses the MIMO scheme, this does not affect an SIC performance.

This will be described below.

Firstly, it will be assumed that a full-duplex node 1200 includes a plurality of antennas, e.g., two antennas, i.e., an antenna #1 1207-1 and an antenna #2 1207-2. The full-duplex node 1200 includes a pre-coder #1 1201, a pre-filter #1 1203-1, a pre-filter #2 1203-2, and a pre-coder #2 1205.

Transmission symbols S1 and S2 to be transmitted are input to the pre-coder #1 1201, and the pre-coder #1 1201 performs a pre-coding operation which corresponds to a preset pre-coding matrix on the transmission symbols S1 and S2 to output the pre-coded signals to the pre-filter #1 1203-1 and the pre-filter #2 1203-2. The pre-filter #1 1203-1 and the pre-filter #2 1203-2 performs a pre-filtering operation which corresponds to a pre-filtering scheme on the pre-coded signal output from the pre-coder #1 1201 to output the pre-filtered signals x1 and x2 to the pre-coder #2 1205, respectively. The pre-coder #2 1205 performs a pre-coding operation which corresponds to a preset pre-coding matrix on the signal output from each of the pre-filter #1 1203-1 and the pre-filter #2 1203-2 to transmit the pre-coded signals through the antenna #1 1207-1 and the antenna #2 1207-2.

In a case that it will be assumed that an SI channel among antennas which occurs when the MIMO scheme is used as described above, the SI channel H among the antennas may be expressed as Equation 2.

$$H = LQ = \begin{bmatrix} l_{11} & 0 \\ l_{21} & l_{22} \end{bmatrix} \begin{bmatrix} q_1 \\ q_2 \end{bmatrix} \quad \text{Equation 2}$$

As expressed in Equation 2, the SI channel H may be decomposed into a lower triangular matrix L and an orthogonal matrix Q using LQ decomposition. Here, if $QHL^{-1}$ is multiplied to an LQ matrix acquired through channel estimation through on a pre-coding operation in a full-duplex node thereby the first signal is generated, diagonal elements of an L matrix are multiplied to the first signal thereby the second signal is generated, and the SI channel H is multiplied to the second signal, a remaining SI component except for a channel gain which corresponds to a self antenna is cancelled.

Even though the full-duplex node uses a MIMO scheme, this does not affect an SIC performance. This may will be expressed as Equation 3.

$$y_{tx} = HQ^H L^{-1} \text{diag}(\text{diag}(L))x + n \quad \text{Equation 3}$$

$$= LQQ^H L^{-1} \text{diag}(\text{diag}(L))x + n$$

$$= \begin{bmatrix} l_{11} & 0 \\ l_{21} & l_{22} \end{bmatrix} \begin{bmatrix} x_1 \\ x_2 \end{bmatrix} + \begin{bmatrix} n_1 \\ n_2 \end{bmatrix}$$

In Equation 3, $y_{tx}$ denotes a transmission signal to which a pre-filtering scheme is applied, diag( ) denotes a function indicating diagonal elements of a matrix, and n denotes noise. Here, the noise n may a matrix including $n_1$ and $n_2$.

The transmission signal $y_{tx}$ to which a pre-filtering scheme as expressed in Equation 3 is applied is received in the other node through a channel G, and a reception signal received in the other node may be expressed as Equation 4.

$$y_{tx} = GQ^H L^{-1} \text{diag}(\text{diag}(L))x + n \quad \text{Equation 4}$$

$$= G_{equal} x + n$$

A process for transmitting/receiving a signal in a case that a 2×2 MIMO scheme is used in a communication system supporting a full-duplex scheme according to an embodiment of the present disclosure has been described with reference to FIG. 12, and an operating process of an SIC apparatus in a case that a 2×2 MIMO scheme is used in a communication system supporting a full-duplex scheme according to an embodiment of the present disclosure will be described with reference to FIG. 13.

Figure 13:
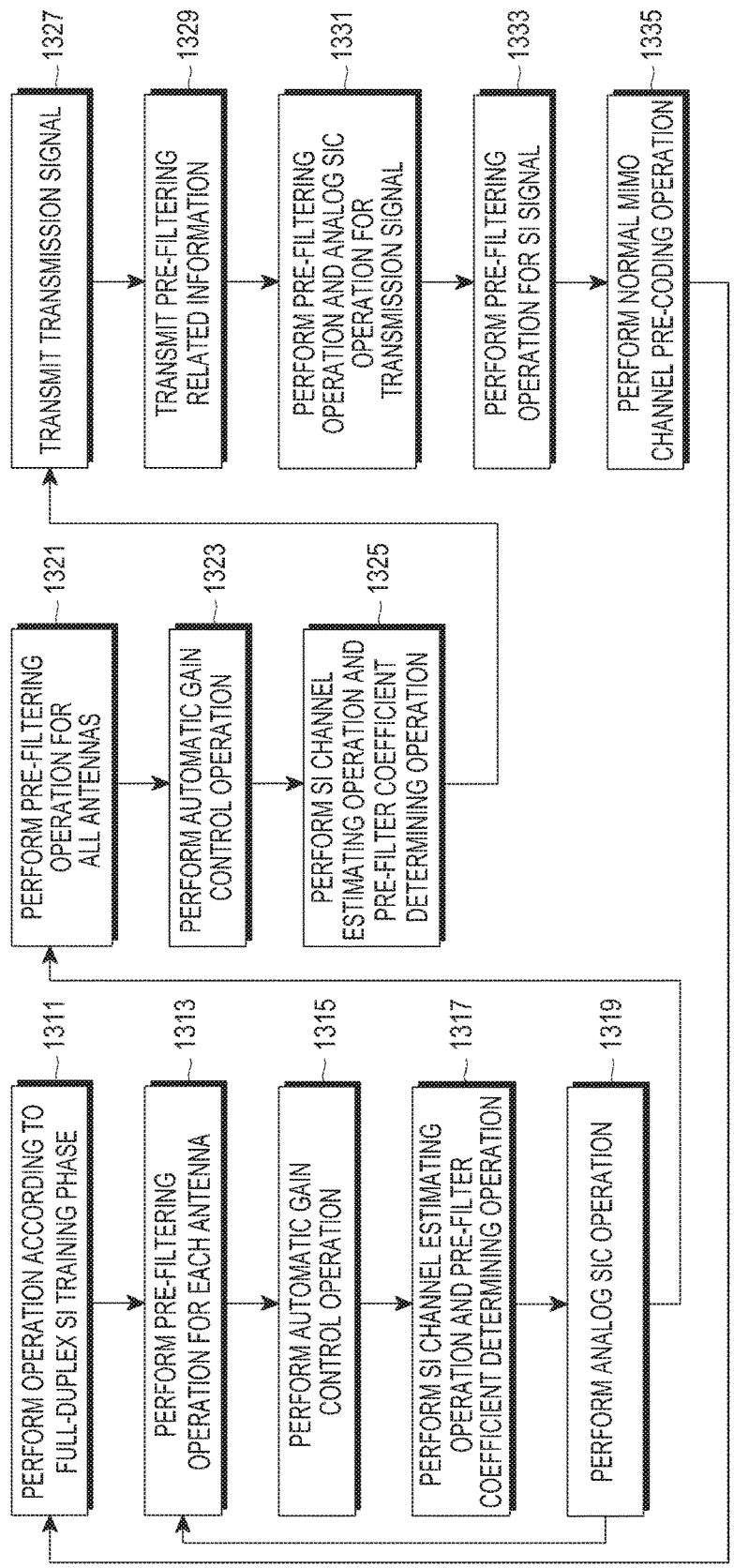
FIG. 13 schematically illustrates an operating process of an SIC apparatus in a case that a 2×2 MIMO scheme is used in a communication system supporting a full-duplex scheme according to an embodiment of the present disclosure.

FIG. 13 schematically illustrates an operating process of an SIC apparatus in a case that a 2×2 MIMO scheme is used in a communication system supporting a full-duplex scheme according to an embodiment of the present disclosure.

Referring to FIG. 13, it will be noted that an operating process of an SIC apparatus in a full-duplex communication system supporting a 2×2 MIMO scheme in FIG. 13 is similar to an operating process of an SIC apparatus in a full-duplex communication system supporting only a single input single output (SISO) scheme except that a pre-filtering operation, a channel estimating operation, and a pre-coding operation for each of a plurality of antennas are performed since a MIMO scheme is supported.

The full-duplex node performs an operation according to a full-duplex SI training phase at operation 1311. The full-duplex node performs a pre-filtering operation for each of antenna included in the full-duplex node at operation 1313. The full-duplex node performs an automatic gain control operation for receiving an SI signal at operation 1315. The automatic gain control operation may be started from a minimum gain and continued until an appropriate gain for the full-duplex node is detected.

The full-duplex node performs an SI channel estimating operation and a pre-filter coefficient determining operation at operation 1317. Further, the full-duplex node estimates a power delay profile at operation 1317. The full-duplex node performs an analog SIC operation at operation 1319. That is, the full-duplex node performs the analog SIC operation by applying a pre-filtering scheme at operation 1319.

The full-duplex node performs a pre-filtering operation for all antennas included in the full-duplex node at operation 1321. The full-duplex node performs an automatic gain control operation for receiving an SIC signal at operation 1323. The automatic gain control operation may be started from a minimum gain and continued until an appropriate gain for the full-duplex node is detected.

The full-duplex node performs an SI channel estimating operation and a pre-filter coefficient determining operation at operation 1325. Further, the full-duplex node estimates a power delay profile at operation 1325. The full-duplex node transmits a transmission signal for which the analog SIC operation is performed to the other node at operation 1327. The full-duplex node transmits pre-filtering related information to the other node in order to prevent degradation of a reception performance of the other node due to reception channel spread which may occur due to the pre-filtering operation at operation 1329. For example, the pre-filtering related information may be a length of a CP, a delay spread length, or/and the like. The full-duplex node performs a pre-filtering operation and an analog SIC operation for a transmission signal at operation 1331, and proceeds to operation 1333.

The full-duplex node performs a pre-filtering operation for an SI signal at operation 1333. The full-duplex node performs a normal MIMO channel pre-coding operation at operation 1335. A detailed description of the general MIMO channel pre-coding operation will be omitted herein.

Although FIG. 13 illustrates an operating process of an SIC apparatus in a case that a 2×2 MIMO scheme is used in a communication system supporting a full-duplex scheme according to an embodiment of the present disclosure, various changes could be made to FIG. 13. For example, although shown as a series of operations, various operations in FIG. 13 could overlap, occur in parallel, occur in a different order, or occur multiple times.

An operating process of an SIC apparatus in a case that a 2×2 MIMO scheme is used in a communication system supporting a full-duplex scheme according to an embodiment of the present disclosure has been described with reference to FIG. 13, and another example of an inner structure of an SIC apparatus in a full-duplex communication system according to an embodiment of the present disclosure will be described with reference to FIG. 14.

Figure 14:
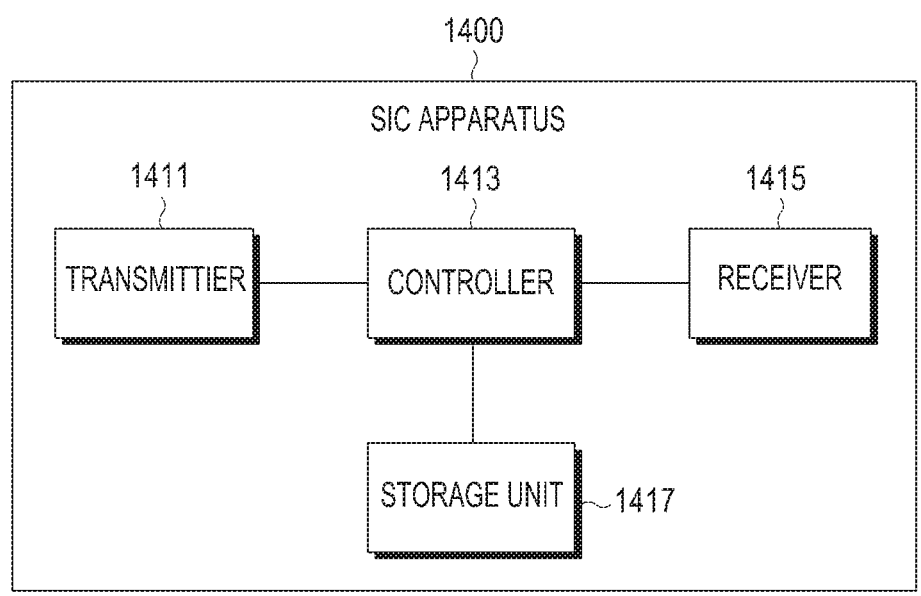
FIG. 14 schematically illustrates another example of an inner structure of an SIC apparatus in a full-duplex communication system according to an embodiment of the present disclosure.

FIG. 14 schematically illustrates another example of an inner structure of an SIC apparatus in a full-duplex communication system according to an embodiment of the present disclosure.

Referring to FIG. 14, an SIC apparatus 1400 includes a transmitter 1411, a controller 1413, a receiver 1415, and a storage unit 1417.

The controller 1413 controls the overall operation of the SIC apparatus 1400. More particularly, the controller 1413 controls an operation related to an SIC operation. The operation related to the SIC operation has been described with reference to FIGS. 1 to 13 and a detailed description thereof will be omitted herein.

The transmitter 1411 transmits various signals and various messages to other entities included in the communication system supporting the full-duplex scheme under a control of the controller 1413. The various signals and various messages transmitted in the transmitter 1411 have been described with reference to FIGS. 1 to 13 and a detailed description thereof will be omitted herein.

The receiver 1415 receives various signals and various messages from other entities included in the communication system supporting the full-duplex scheme under a control of the controller 1413. The various signals and various messages received in the receiver 1415 have been described with reference to FIGS. 1 to 13 and a detailed description thereof will be omitted herein.

The storage unit 1417 stores various programs, various data, and the like related to the SIC operation performed by the SIC apparatus 1400 under a control of the controller 1413.

The storage unit 1417 stores various signals and various messages which are received by the receiver 1415 from the other entities.

While the transmitter 1411, the controller 1413, the receiver 1415, and the storage unit 1417 are described in the SIC apparatus 1400 as separate units, it is to be understood that this is merely for convenience of description. In other words, two or more of the transmitter 1411, the controller 1413, the receiver 1415, and the storage unit 1417 may be incorporated into a single unit.

The SIC apparatus 1400 may be implemented with one processor.

As is apparent from the foregoing description, an embodiment of the present disclosure enables to cancel an SI signal in a communication system.

An embodiment of the present disclosure enables to cancel an SI signal in a communication system supporting a full-duplex scheme.

An embodiment of the present disclosure enables to cancel an SI signal thereby decreasing the number of SI signals in a communication system supporting a full-duplex scheme.

An embodiment of the present disclosure enables to cancel an SI signal based on a pre-filtering scheme in a communication system supporting a full-duplex scheme.

An embodiment of the present disclosure enables to cancel an SI signal in a case that a MIMO scheme is used in a communication system supporting a full-duplex scheme.

An embodiment of the present disclosure enables to cancel an SI signal thereby decreasing the number of SI signals in a case that a MIMO scheme is used in a communication system supporting a full-duplex scheme.

An embodiment of the present disclosure enables to cancel an SI signal based on a pre-filtering scheme in a case that a MIMO scheme is used in a communication system supporting a full-duplex scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for cancelling a self-interference (SI) signal in a communication system supporting a full-duplex scheme, the method comprising:
   estimating an SI channel;
   performing a pre-filtering operation on a transmission signal based on the estimated SI channel;
   generating copied-SI signals based on the estimated SI channel and the pre-filtered transmission signal; and
   cancelling an SI signal based on the copied-SI signals,
   wherein the pre-filtering operation includes an operation for decreasing a number of SI signals, and
   wherein the performing of the pre-filtering operation on the transmission signal based on the estimated SI channel comprises:
      acquiring a pre-filter which is time reverse for the estimated SI channel and is a complex conjugate, and
      filtering the transmission signal based on the acquired pre-filter.

2. The method of claim 1, further comprising:
   transmitting the pre-filtered transmission signal.

3. The method of claim 1, further comprising:
   transmitting the pre-filtered transmission signal; and
   transmitting information related to the pre-filtering operation.

4. The method of claim 3, wherein the information related to the pre-filtering operation includes channel information for equalization of a receiving apparatus which receives the transmission signal.

5. An apparatus for cancelling a self-interference (SI) signal in a communication system supporting a full-duplex scheme, the apparatus comprising:
   a first processor configured to estimate an SI channel, and to perform a pre-filtering operation on a transmission signal based on the estimated SI channel; and
   second processors configured to generate copied-SI signals based on the estimated SI channel and the pre-filtered transmission signal,
   wherein the first processor is further configured to cancel an SI signal based on the copied-SI signals,
   wherein the pre-filtering operation includes an operation for decreasing a number of SI signals, and
   wherein the first processor is configured to acquire a pre-filter which is time reverse for the estimated SI channel and is a complex conjugate, and filter the transmission signal based on the acquired pre-filter.

6. The apparatus of claim 5, further comprising:
   a transmitter configured to transmit the pre-filtered transmission signal and transmit information related to the pre-filtering operation.

7. The apparatus of claim 6, wherein the information related to the pre-filtering operation includes channel information for equalization of a receiving apparatus which receives the transmission signal.

8. The apparatus of claim 5, wherein the first processor is further configured to:
   estimate power delay profile for a reception signal, and
   control an operation of the second processors based on the estimated power delay profile.

9. The apparatus of claim 8, wherein each of the second processors comprises variable gain controllers, variable phase controllers, and variable delay controllers.

10. The apparatus of claim 9, wherein each of the variable gain controllers, the variable phase controllers, and the variable delay controllers is controlled based on the estimated power delay profile.

11. The apparatus of claim 5, wherein the first processor is further configured to control an attenuation value for a reception signal.

12. The apparatus of claim 11, wherein the first processor is further configured to combine the pre-filtered transmission signal and the reception signal of which the attenuation value is controlled.

13. The apparatus of claim 12, wherein the first processor is further configured to estimate an SI channel based on a signal that the copied-SI signals and the reception signal of which the attenuation value is controlled are combined.

14. The apparatus of claim 12, further comprising:
a low noise amplifier configured to low noise amplify a signal that the copied-SI signals and the reception signal of which the attenuation value is controlled are combined.

15. The apparatus of claim 5, further comprising:
a low noise amplifier configured to low noise amplify a reception signal.

16. The apparatus of claim 15, wherein the first processor is further configured to control an attenuation value for the low noise amplified signal.

17. The apparatus of claim 16, wherein the first processor is further configured to combine the pre-filtered transmission signal and the reception signal of which the attenuation value is controlled.

18. The apparatus of claim 17, wherein the first processor is further configured to estimate an SI channel based on a signal that the copied-SI signals and the reception signal of which the attenuation value is controlled are combined.

* * * * *